US011709870B2

(12) United States Patent
Worster

(10) Patent No.: US 11,709,870 B2
(45) Date of Patent: Jul. 25, 2023

(54) COMPREHENSIVE UTILITY LINE DATABASE AND USER INTERFACE FOR EXCAVATION SITES

(71) Applicant: Worster Construction Management LLC, San Jose, CA (US)

(72) Inventor: Michael Worster, San Jose, CA (US)

(73) Assignee: Worster Construction Management LLC, San Jose, CA (US)

( * ) Notice: Subject to any disclaimer, the term of this patent is extended or adjusted under 35 U.S.C. 154(b) by 397 days.

(21) Appl. No.: 16/924,045

(22) Filed: Jul. 8, 2020

(65) Prior Publication Data

US 2022/0012270 A1   Jan. 13, 2022

(51) Int. Cl.
*G06F 16/29* (2019.01)
*G06F 17/18* (2006.01)
*G06V 10/20* (2022.01)
*G01S 19/01* (2010.01)

(52) U.S. Cl.
CPC .............. *G06F 16/29* (2019.01); *G06F 17/18* (2013.01); *G06V 10/255* (2022.01); *G01S 19/01* (2013.01)

(58) Field of Classification Search
CPC .......... G01S 19/01; G06F 16/29; G06F 17/18; G06Q 10/063; G06Q 10/103; G06Q 50/06; G06Q 50/08; G06V 10/255; G06V 20/56
See application file for complete search history.

(56) References Cited

U.S. PATENT DOCUMENTS

| 8,589,202 | B2 | 11/2013 | Nielsen et al. |
| 8,666,815 | B1* | 3/2014 | Chau ................... G06Q 30/0257 |
| | | | 705/14.63 |
| 8,861,795 | B2 | 10/2014 | Nielsen et al. |
| 9,177,280 | B2 | 11/2015 | Nielsen et al. |
| 9,286,624 | B2* | 3/2016 | Chau ....................... G06T 11/00 |
| 10,445,772 | B1* | 10/2019 | Chau ....................... G06T 7/337 |
| 2004/0210370 | A1 | 10/2004 | Gudat et al. |

(Continued)

FOREIGN PATENT DOCUMENTS

| CN | 105426461 B | 11/2018 |
| CN | 109033210 A | 12/2018 |

(Continued)

*Primary Examiner* — Yoshihisa Ishizuka
(74) *Attorney, Agent, or Firm* — Fenwick & West LLP

(57) ABSTRACT

A graphical user interface may provide a digital map that includes digital marks for utility lines and excavation boundary. To determine the location information of a ground mark, a computing server may receive an image of a street view of a site and identify one or more ground marks from the image. The computing server may receive geographic information system (GIS) data, which records surveyed location information of benchmarks at the site. The computing server may identify, using an object recognition algorithm, pixels in the image of the street view that correspond to the benchmarks recorded in the GIS data. The computing server may determine, based on relative distances between the pixels that correspond to the benchmarks and the ground marks, location data of the ground marks. The computing server may transmit the location data for display in a digital map that includes digital marks corresponding to the ground marks.

20 Claims, 9 Drawing Sheets

(56) References Cited

U.S. PATENT DOCUMENTS

| | | | | |
|---|---|---|---|---|
| 2009/0238417 | A1* | 9/2009 | Nielsen | G06F 16/29 |
| | | | | 382/113 |
| 2010/0257477 | A1 | 10/2010 | Nielsen et al. | |
| 2016/0260048 | A1* | 9/2016 | Uerbach | G06Q 10/063114 |
| 2017/0154425 | A1* | 6/2017 | Pierce | G06N 3/0445 |

FOREIGN PATENT DOCUMENTS

| | | |
|---|---|---|
| CN | 105678006 B | 2/2020 |
| CN | 110853118 A | 2/2020 |
| JP | 2000-500195 A | 1/2000 |
| JP | 2002-285585 A | 10/2002 |
| JP | 2003-056010 A | 2/2003 |
| JP | 2005-274994 A | 10/2005 |

* cited by examiner

COMPREHENSIVE UTILITY LINE DATABASE AND USER INTERFACE FOR EXCAVATION SITES

TECHNICAL FIELD

The present disclosure generally relates to a database and a graphical user interface that includes a digital map to provide excavation information and, more specifically, to digital maps that include location-accurate digital marks that correspond to ground marks of a site.

BACKGROUND

Excavation notifications and underground service alerts are important to protect underground utility lines from being damaged during excavation. For example, in the United States, this type of notifications coordination has been centralized as the 8-1-1 call center. Any entities attempting to break ground for the purposes of excavation are often required to notify the 8-1-1 call center (or a similar alert service body). Many countries often impose a waiting period before digging can begin. In the United States, the details of a proposed excavation project are compiled into a "USA ticket" notification that is electronically routed to relevant underground utility operators within the intended dig location area. The utility operators have normally 24 hours to two days to respond to the notification. If the utility operators believe their facilities are in the dig area, those operators will need to physically mark the approximate location of those facilities with ground marks. The markings are often color-coded to denote utility type (water, communications, power, gas, etc.) and include other information such as facility owner, basic build, materials, number of individual lines, and other engineering specifications.

Many excavation projects are so extensive and risky that the planning process warrants that utility mapping be obtained from each utility company within the project scope. The planning process for large excavation projects, such as utility installation projects that span thousands of feet, can take more than a year to complete due to the delay in obtaining underground utility maps and uncertainly of the accuracy of those maps in terms of geospatial placement.

SUMMARY

Disclosed herein relates to example embodiments of computing servers and graphical user interfaces that provide digital excavation information. In some embodiments, an example process may include receiving an image of a street view of a site. The process may also include identifying one or more ground marks from the image. The ground marks may be related to utility line marks or excavation marks painted on the ground. The process may also include receiving geographic information system (GIS) data of the site. The GIS data recording surveyed location information of a plurality of benchmarks at the site. The process may further include identifying, using an object recognition algorithm, pixels in the image of the street view that correspond to one or more benchmarks recorded in the GIS data. The process may further include determining, based on relative distances between the pixels that correspond to the one or more benchmarks and the one or more ground marks, location data of the one or more ground marks. The process may further include transmitting the location data for display in a digital map that includes one or more digital marks corresponding to the one or more ground marks.

In yet another embodiment, a non-transitory computer readable medium that is configured to store instructions is described. The instructions, when executed by one or more processors, cause the one or more processors to perform a process that includes steps described in any computer-implemented methods described in any embodiments of this disclosure. In yet another embodiment, a system may include one or more processors and a storage medium that is configured to store instructions. The instructions, when executed by one or more processors, cause the one or more processors to perform a process that includes steps described any computer-implemented methods described in any embodiments of this disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed embodiments herein relate to providing digital excavation information and digital marks on a digital map so that entities involved in excavation projects can easily locate utility line marks and excavation site boundaries. The locations of underground utility lines are often difficult to pinpointed because utility line marks painted on the ground may be removed due to pavement or other excavation projects in the same area. The records of the locations the utility lines maintained by the utility companies are often imprecise for excavators to readily identify the locations of utility lines. A computing server described herein may capture images of the ground marks and determine location information of the ground marks through various algorithms, such as by comparing a ground mark location to nearby benchmarks whose location are known. The computing server may maintain a database of excavation and utility line information so that the utility lines and related information can be digitally displayed on a map, thereby allowing excavators to locate underground utility lines more easily.

Example System Environment

Figure 1:
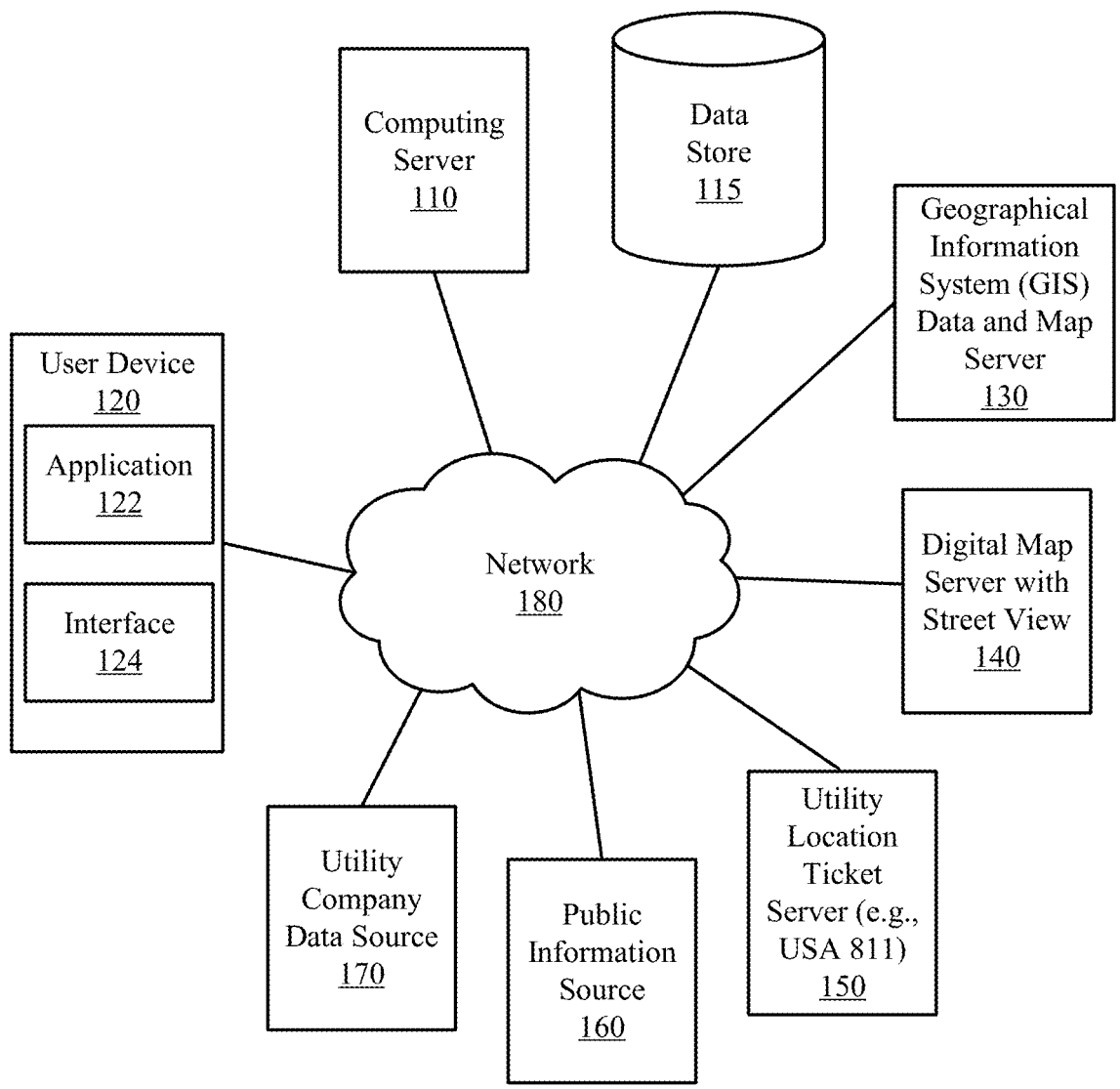
FIG. 1 is a block diagram illustrating an example system environment, in accordance with some embodiments.

Referring now to FIG. 1, shown is a block diagram illustrating an embodiment of an example system environment 100 of an excavation information database, in accordance with some embodiments. By way of example, the system environment 100 includes a computer server 110, a data store 115, a user device 120, a geographical information system (GIS) data and map server 130, a digital map server 140, a utility location ticket server 150, a public information source 160, and a utility company data source 170. The entities and components in the system environment 100 may communicate with each other through the network 180. In various embodiments, the system environment 100 may include fewer or additional components. The system environment 100 also may include different components. Also, while each of the components in the system environment 100 is described in a singular form, the system environment 100 may include one or more of each of the components. For example, there may be multiple user devices 120 that are associated with various users. Likewise, there can be more than one public information source 160, utility company data source 170, etc. For simplicity, multiple instances of a type of entity or component in the system environment 100 may be referred to in a singular form even though it may include one or more entities or components.

A computing server 110 may include one or more computing devices that perform various tasks related to extracting and providing excavation-related information, including, but not limited to, identifying past excavation sites, performing data mining on relevant excavation and utility line information of various sites, maintaining databases for excavation and utility line information, providing digital maps that include accurate digital utility line marks and past excavation information, and providing live supports to excavation personnel. The organization operating the computing server 110 may provide services and data to excavation workers, site engineers, construction contractors, utility companies, local, municipal, state, and federal government agencies, and other suitable individuals and organizations in the form of subscription, pay per use, software as a service (SaaS), software application, freemium, or a completely free service. The computing server 110 collects images of street views of various sites (e.g., urban sites), such as by parsing screencaps of various street views online or asking users (e.g., excavation workers, underground utility line locators, and utility technicians) to take images at the sites. The computing server 110 employs various image processing and machine learning techniques to identify utility line marks and match those marks with other information sources to determine the accurate locations of those marks. The computing server 110 provides the location data of the utility line marks to various users such as by displaying those marks and their location data in a digital map.

Figure 8:
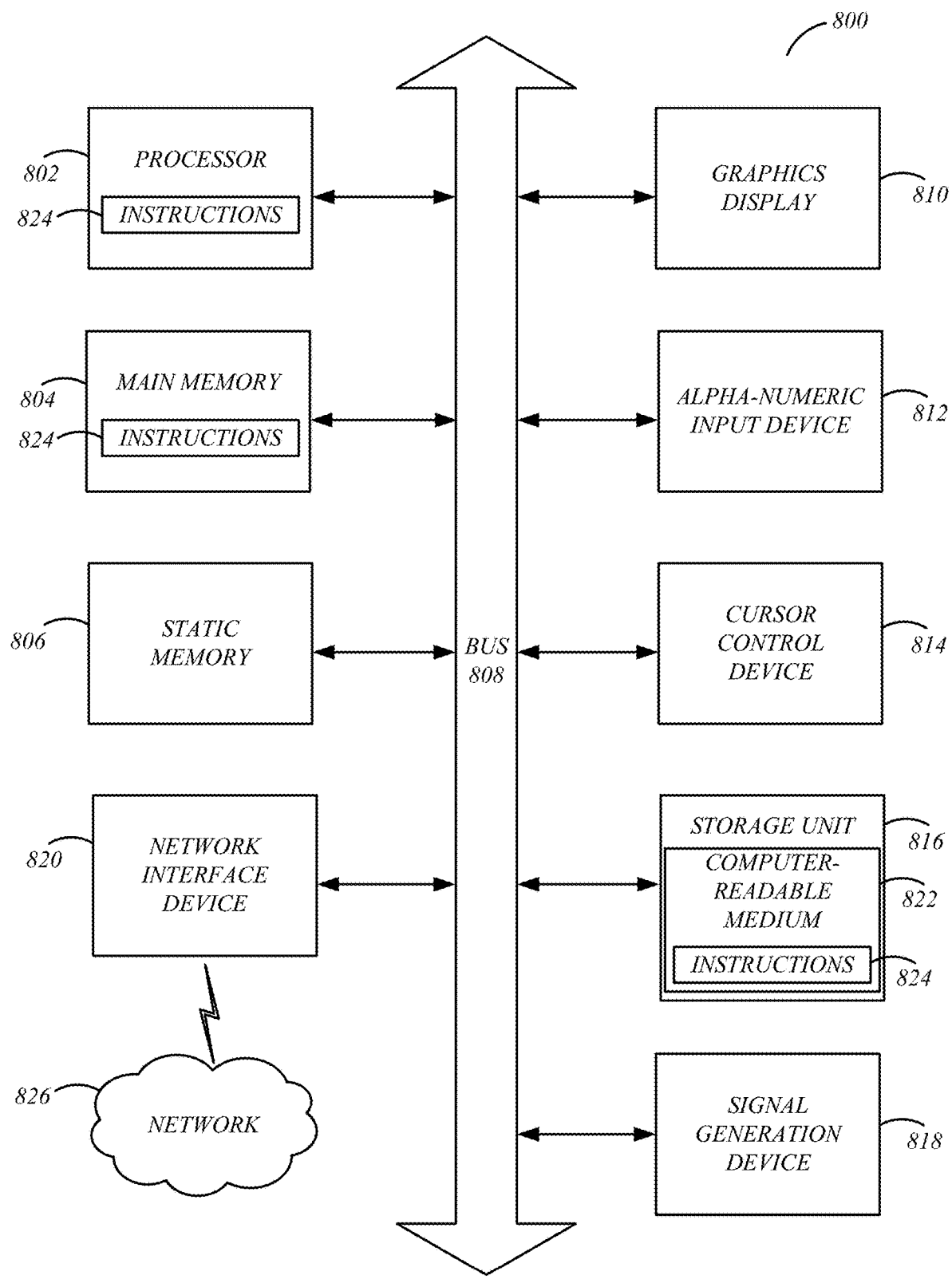
FIG. 8 is a block diagram illustrating components of an example computing machine, in accordance with some embodiments.

The computing server 110 may take the form of a combination of hardware and software. Some or all of the components of a computing machine of the computing server 110 is illustrated in FIG. 8. The computing server 110 may take different forms. In some embodiments, the computing server 110 may be a server computer that executes code instructions to perform various processes described herein. In other cases, the computing server 110 may be a pool of computing devices that may be located at the same geographical location (e.g., a server room) or be distributed geographically (e.g., clouding computing, distributed computing, or in a virtual server network). The computing server 110 may also include one or more virtualization instances such as a container, a virtual machine, a virtual private server, a virtual kernel, or another suitable virtualization instance. The computing server 110 may perform various tasks related to extracting and providing excavation-related information as a form of cloud-based software, such as software as a service (SaaS), through the network 180. Alternatively, or additionally, to the SaaS, the computing server 110 may provide on-premise software to certain organizations such as large construction contractors, utility companies and government agencies.

The data store 115 includes one or more storage units such as memory that takes the form of non-transitory and non-volatile computer storage medium to store various data that obtained by the computing server 110 or by various users of the computing server 110. For example, the data stored in data store 115 may include location data of utility lines, map data, images of street views that include utility line marks. The computer-readable medium is a medium that does not include a transitory medium such as a propagating signal or a carrier wave. The data store 115 may take various forms. In one embodiment, the data store 115 communicates with other components by the network 180. This type of data store 115 may be referred to as a cloud storage server. Example cloud storage service providers may include AMAZON AWS, DROPBOX, RACKSPACE CLOUD FILES, AZURE BLOB STORAGE, GOOGLE CLOUD STORAGE, etc. In another embodiment, instead of a cloud storage server, the data store 115 is a storage device that is controlled and connected to the computing server 110. For example, the data store 115 may take the form of memory (e.g., hard drives, flash memory, discs, ROMs, etc.) used by the computing server 110 such as storage devices in a storage server room that is operated by the computing server 110.

A user device 120 may be a computing device that can transmit and receive data via the network 180. A user device 110 may be any computing device. Some or all of the components of a user device 120 is illustrated in FIG. 8. Examples of such user devices 120 include personal computers (PC), desktop computers, laptop computers, tablets (e.g., IPADs), smartphones, wearable electronic devices such as smartwatches, application-specific devices designed to be specifically used with the computing server 110, or any other suitable electronic devices.

Users of the computing server 110 may include, but not limited to, excavation field users such as forepersons, leads, equipment operators, inspectors, site engineers, and workers, excavation engineering personnel and managers such as project managers, civil and construction engineers, records managers, personnel from various utility companies, contract locator vendors, government agencies, and any other suitable users such as those involved in construction, excavation, utility, safety, compliance, and regulatory sectors. A user also may be referred to as a client or an end user of the computing server 110. The user device 120 may be referred to as a client device or an end user device. A user may use the user device 120 to retrieve information related to excavation or utility lines such as accessing, storing, creating, and modifying utility line records and past excavation projects, accessing and viewing digital maps that display accurate utility line markers and locations, providing photo and real-time feedbacks related to an excavation or other construction projects, communicating with utility companies, and retrieving other useful information related to excavation sites or other areas in general. In some embodiments, a user device 120 includes one or more applications 122 and user interfaces 114 that may display visual elements of the applications 122.

An application 122 may be any suitable software application that operates at the user device 120. A user device 120 may include various applications 122 such as a software application provided by the computing server 110. The application 122 may provide a digital map that displays various utility lines and excavation information on or next to the map. An application 122 may be of different types. In one case, an application 122 may be a web application that runs on JavaScript or other alternatives, such as TypeScript, etc. In the case of a web application, the application 122 cooperates with a web browser to render a front-end interface 124. In another case, an application 122 may be a mobile application. For example, the mobile application may run on Swift for iOS and other APPLE operating systems or on JAVA or another suitable language for ANDROID systems. In yet another case, an application 122 may be a software program that operates on a desktop computer that runs on an operating system such as LINUX, MICROSOFT WINDOWS, MAC OS, or CHROME OS.

An interface 124 may be a suitable interface for a client device 120 to interact with computing server 110. The interface 124 may include various visualizations and graphical elements to display information for users and may also include input fields to accept inputs from users. A user may communicate to the application 122 and the computing server 110 through the interface 124. The interface 124 may take different forms. In one embodiment, the interface 124 may be a web browser such as CHROME, FIREFOX, SAFARI, INTERNET EXPLORER, EDGE, etc. and the application 122 may be a web application that is run by the web browser. In another application, the interface 124 is part of the application 122. For example, the interface 124 may be the front-end component of a mobile application or a desktop application. The interface 124 also may be referred to as a graphical user interface (GUI) which includes graphical elements to display a digital map and excavation-related information. In another embodiment, the interface 124 may not include graphical elements but may communicate with the computing server 110 via other suitable ways such as application program interfaces (APIs).

A geographical information system (GIS) data and map server 130 may be a third party server that provides accurate location data of various benchmarks, such as landmarks, monuments, property developments, buildings, property lines, street lights, traffic lights, road signs, gutters, railroad tracks, storm drains, trees and plants. The GIS data and map server 130 may provide highly accurate location data for some of the benchmarks. For example, property lines, locations of streetlights, railroad tracks, locations of certain trees are often surveyed with a margin of error less than a foot, a few inches, or even an inch. The accuracy standard of the location data of those surveyed benchmarks may be in compliance with one or more industry standards set forth by organizations such as the American Land Title Association (ALTA), the American Society of Civil Engineers (ASCE), and the American Congress on Surveying and Mapping (ACSM). Various municipal and state regulations may also set forth survey standards. In this disclosure, a survey-accurate location data refers to location data that is in compliance with one or more commonly accepted survey standards or location data whose margin of error is within the same order of magnitude as those survey standards (e.g., the margin of error that is at most less than 10 times of an acceptable survey standard). Location data of various benchmarks may be recorded and provided in the form of the Global Positioning System (GPS) data. While not every benchmark in a map provided by a GIS data and map server 130 may include location data that is survey accurate, a GIS data and map server 130 may include a large number of benchmarks, such as property lines, street lines, railroad tracks, that are associated with survey-accurate location data. Examples of GIS data and map servers 130 include the computing server 110, ESRI and MAPTITUDE. For instance, ESRI provides ArcGIS that includes various survey-accurate location data.

A digital map server 140 with street views may be any suitable digital map service provider that provides digital maps that provide elevated views (e.g., bird's-eye views, high-resolution satellite views, drone views, other aerial views) and/or perspective views of persons on the streets (e.g., those captures by pedestrians or panoramic view captured by land vehicles). Street views here refer to views that display some details of the streets and are not limited to only views that are captured from persons or vehicles on the streets. For example, a bird's-eye view or a satellite view that has a sufficient resolution may be qualified as a street view. Also, street views here are not limited to urban streets. Street views can also include images of rural areas, such as fields, parks, or other lands that may or may include identifiable alleys or streets. Various common digital map servers may provide street views, such as GOOGLE MAP, MAPILLARY, OPENSTREETCAM, APPLE MAP, etc. In some embodiments, the computing server 110 may also be an example of a digital map server 140 with street view. In some embodiments, the computing server 110 parses street views from a third party digital map server 140 and uses one or more artificial intelligence and image processing techniques to identify one or more ground marks (e.g., utility line marks, excavation site marks) on the streets. The computing server 110 compares the location of the ground marks to benchmarks in the same site as identified by the location data, such as survey-accurate location data, provided by a GIS data and map server 130. In turn, the computing server 110 estimates the location data of the ground marks.

A utility location ticket server 150 may be a server operated by an organization such as the 8-1-1 call center to coordinate excavation projects to prevent damages of any utility lines during any digging. For an excavation project, an excavator may be statutorily required to reach out to the utility location ticket server 150 to describe the detail of the excavation project. The utility location ticket server 150 may generate an excavation project ticket and notify relevant utility companies regarding the upcoming excavation. Certain waiting periods and marking requirements may also be imposed on the excavators before digging begins. The utility location ticket server 150 may store past excavation project tickets. The computing server 110 may retrieve some of those excavation project tickets that are public information from the utility location ticket server 150.

A public information source 160 provides public information related to real properties, public properties, utilities, constructions, permits, and other relevant data related to excavation and construction. In the system environment 100, there can be various types of public information source 160. For example, one public information source 160 may provide the assessor's parcel numbers (APNs) and related real property information such as property lines. In another example, a public information source 160 may provide location data of storm drains, light poles, public trees, street signs, etc. In yet another example, a public information source 160 may save construction permits for various locations. In yet another example, a public information source 160 may be a water company or a city commissioner that provides data related to utility lines and permits. A public information source 160 may be private or public that is at municipal, local, state, or federal level. The computing server 110 may retrieve data from various public information sources 160 through any suitable ways, such as by manually requesting the data, licensing the data, or through one or more APIs.

A utility company data source 170 may provide information such as specification and location data of utility lines. A utility company data source 170 may be a utility company or a third-party data provider that collects information from various utility companies. Examples of utility lines include cable lines, fiber optics, telephone lines, other lines for telecommunication, electricity and other power lines, gas pipes, traffic light lines, streetlight lines, storm drains, water pipes, wastewater pipes, etc. Utility lines are often underground. Utility companies store location data and specifications (e.g., size, length, date of installation) of utility lines. However, the location data is often far from survey accurate. For example, an entry of location data of a water pipe stored in a water company may describe the water pipe as at around 2 to 3 feet from the curb of the sidewalk of a street without depth information. The actual location of the water pipe is often difficult to find. In some cases, a utility line mark is painted to the ground to identify the location of the underground utility line. However, the mark may be faded or removed by new painting or pavement. As a result, it is often challenging for an excavator to locate the underground utility line at an excavation site.

The network 180 provides connections to the components of the system environment 100 through one or more subnetworks, which may include any combination of the local area and/or wide area networks, using both wired and/or wireless communication systems. In one embodiment, a network 180 uses standard communications technologies and/or protocols. For example, a network 180 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 180 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 180 may be represented using any suitable format, such as hypertext markup language (HTML), extensible markup language (XML), JavaScript object notation (JSON), structured query language (SQL). In some embodiments, all or some of the communication links of a network 180 may be encrypted using any suitable technique or techniques such as secure sockets layer (SSL), transport layer security (TLS), virtual private networks (VPNs), Internet Protocol security (IPsec), etc. The network 180 also includes links and packet switching networks such as the Internet.

Example Computing Server Components

Figure 2:
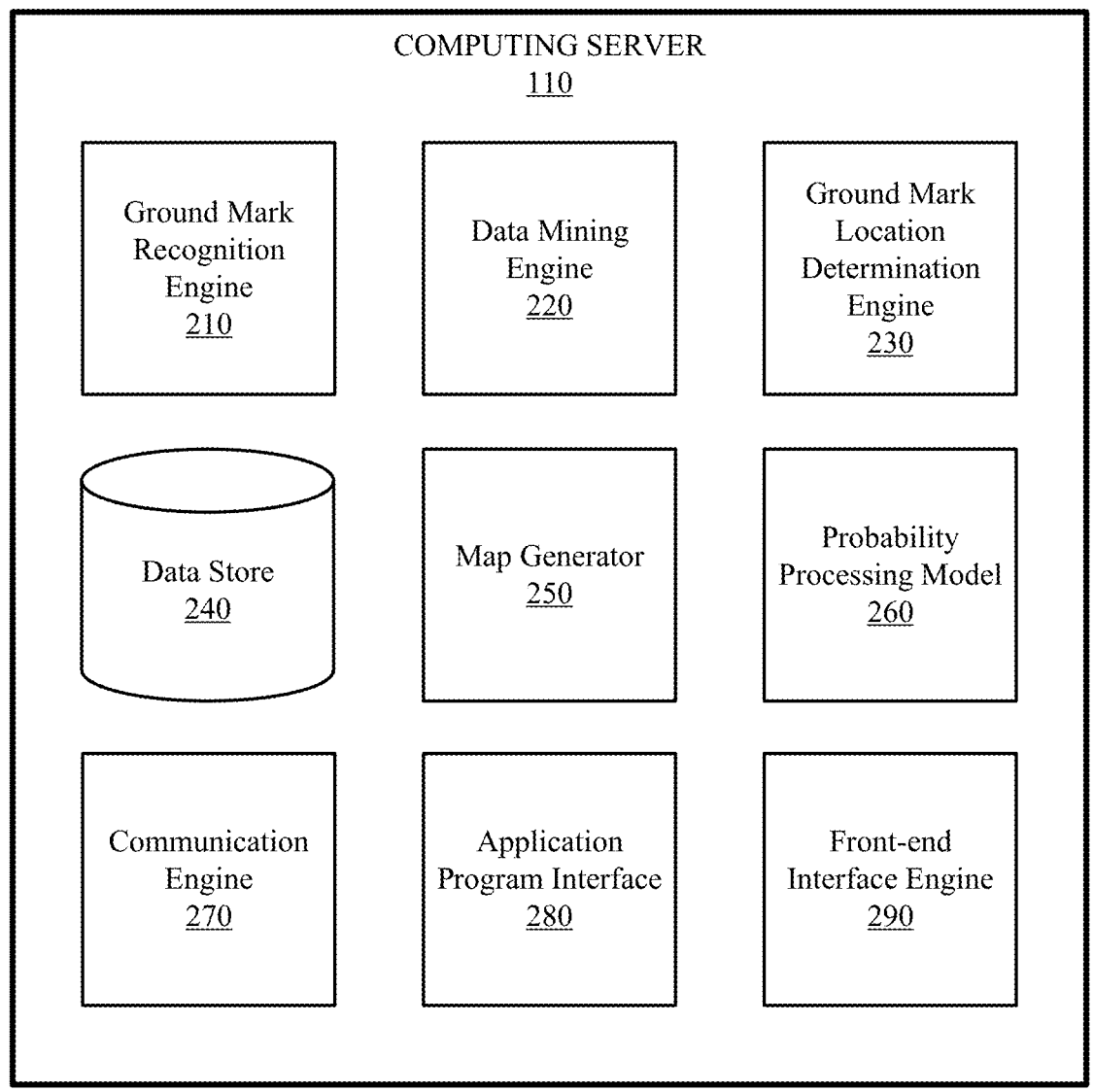
FIG. 2 includes block diagrams illustrating various components of an example computing server, in accordance with some embodiments.

FIG. 2 is a block diagram illustrating various components of an example computing server 110, in accordance with some embodiments. In various embodiments, the computing server 110 may include fewer or additional components. The computing server 110 also may include different components. The functions of various components in the computing server 110 may be distributed in a different manner than described below. Moreover, while each of the components in FIG. 2 may be described in a singular form, the components may be present in plurality. Further, the components of the computing server 110 may be embodied as modules that include software (e.g., program code including instructions) that is stored on an electronic medium (e.g., memory) and executable by a processing system (e.g., one or more general processors). The components also could be embodied in hardware, e.g., field-programmable gate arrays (FPGAs) and/or application-specific integrated circuits (ASICs), that may include circuits alone or circuits in combination with firmware and/or software.

A computing server 110 includes various components that perform tasks related to extracting and providing excavation-related information. In some embodiments, the computing server 110 may include a ground mark recognition engine 210, a data mining engine 220, a ground mark location determination engine 230, a data store 240, a map generator 250, a probability processing model 260, a communication engine 270, an application program interface (API) 280, and a front-end interface engine 290. Each engine and component in the computing server 110 may include software algorithms that work with hardware as described in FIG. 8.

A ground mark recognition engine 210 may correspond to various sets of software instructions stored in a memory that are executable by a processor. The ground mark recognition engine 210 identifies various types of ground marks in images (e.g., screenshots, photos, pictures) of street views and extracts information of the identified ground marks. Ground marks are paints on the ground that include various symbols and colors that signify the type of utility lines or excavation sites and other information of the utility lines or the excavation sites. Ground marks may also be referred to as utility line marks. For example, in the United States, red marks are statutorily associated with electric power lines. Different types of symbols such as arrows may be used to signify the type of lines and the general orientation of the lines. The ground marks may also include numbers and letters to signify the sizes of the pipes, materials, and owners of the facility. The ground mark recognition engine 210 identifies the ground marks in images of street views, determines the colors and symbols of the ground marks, and extracts textual information in the marks.

In some embodiments, the ground mark recognition engine 210 includes various machine learning and image processing algorithms for identifying ground marks and extracting information included in the ground marks. The computing server 110 receives images of street views of various locations, such as by parsing screenshots of the street-view mode of digital maps provided by various sources such as a digital map server 140 and by receiving photos taken by users at the locations. The ground mark recognition engine 210 may use various object recognition, image segmentation, and contouring techniques to identify and isolate the ground marks from the rest of the environment. For example, the ground mark recognition engine 210 may include a convolutional neural network (CNN) that is trained with training samples of known ground marks to identify potential ground marks in images of street views. The training of various machine learning models is discussed in further detail below with reference to FIG. 7. Since the ground marks are colored, in the area of an image that is identified as a potential ground mark, the ground mark recognition engine 210 may identify pixels that have the same or similar color or intensity to segment the ground marks from the rest of the environment. Various edge detection algorithms (e.g., Canny operator, Laplacian operator, Sobel operator, Prewitt operator), corner detection algorithms, Hough transform, and other suitable feature detection algorithms may also be used to isolate the marks from the rest of the environment. The ground mark recognition engine 210 may also include additional machine learning algorithms such as another CNN for recognizing symbols, numbers, and characters that are isolated.

A data mining engine 220 may correspond to various sets of software instructions stored in a memory that are executable by a processor. The data mining engine 220 retrieves or parses relevant data related to excavation, construction, and utility lines from various data sources such as the GIS data and map server 130, the utility location ticket server 150, the public information source 160, and the utility company data source 170. For example, from a GIS data and map server 130, the data mining engine 220 may retrieve, through an API, GIS information such as survey-accurate location data of various benchmarks in different locations. The data mining engine 220 may also retrieve map data from the GIS data and map server 130. From a utility location ticket server 150, the data mining engine 220 may retrieve past excavation project tickets. From a public information source 160, the data mining engine 220 may retrieve public information related to real properties, public properties (e.g., traffic lights, streetlights, other benchmark locations), utilities, constructions, permits, and other relevant data related to excavation and construction. From a utility company data source 170, the data mining engine 220 may retrieve records of utility line location data and specifications.

The data mining engine 220 may convert data from various sources into a more standardized format and consolidate data into a database. Raw data retrieved by the data mining engine 220 may include structured and unstructured data. For example, the GIS information retrieved from the GIS data and map server 130 may be structured data. In contrast, the data from a public information source 160 often may be unstructured. For example, a public information source 160 that provides construction permits may provide images of the construction permits. The data mining engine 220 may include various data parsing algorithm that extracts information from unstructured data. The data parsing algorithm may include one or more natural language processing (NLP) algorithms that identify relevant keywords and context of unstructured data to parse relevant information (e.g., utility line specification, location data, construction specification, key dates) from unstructured data. The data mining engine 220 may also consolidate data from various sources. A data schema and types of metadata may be defined, and relevant information related to an entry may be linked. For instance, in some embodiments, the data may be arranged based on locations. For each location, relevant information, such as utility line information, past construction permits, property line locations, other GIS information may be collected from various data sources and linked together in a structured database.

The ground mark location determination engine 230 may correspond to various sets of software instructions stored in a memory that executable by a processor. The ground mark location determination engine 230 determines accurate location data of ground marks and generates data values, such as in the form of metadata, on how the paints of the ground marks may be digitally drawn and displayed in a digital map. While utility companies may maintain records of the location data of the utility lines, the location data from the utility companies are often inaccurate or too vague. The location data maintained by the utility companies sometimes also does not match the ground marks. Hence, the information from the utility companies is often insufficient to identify the precise location of a utility line. The ground mark location determination engine 230 relies on data generated by the ground mark recognition engine 210 and the data mining engine 220 to determine much more accurate location data of ground marks.

The ground mark location determination engine 230 may include one or more data analyzing and image transformation algorithms to determine the location data of ground marks. By way of example, the computing server 110 may receive an image of a street view of a site. The computing server 110 identifies one or more ground marks from the image, such as by using the algorithms of the ground mark recognition engine 210. The computing server 110 receives GIS data of the site, such as by using the data mining engine 220 to retrieve the GIS data from a GIS data and map server 130. The GIS data may record surveyed location data of various benchmarks at the site. For example, the GIS data may include survey-accurate location data of a property line and a streetlight. The ground mark location determination engine 230 may include one or more object recognition algorithms, such as a CNN, to recognize one or more benchmarks that are described in the GIS data. For example, the benchmarks may include property lines and streetlights The ground mark location determination engine 230 identifies, using the object recognition algorithm, pixels in the image of the street view that corresponds to the benchmarks that are recorded in the GIS data. The ground mark location determination engine 230 determines, based on the relative distances between the pixels that correspond to the benchmarks and the ground marks, the location data of the ground marks. The location data may be in the format of GPS data. Details of the determining of the location data of the ground marks using GIS surveyed location data and images of street views will be discussed below with reference to FIGS. 4, 5A, and 5B.

A data store 240 may be a data store of the computing server 110 that is used to store data generated by the computing server 110, data obtained by the data mining engine 220, photos of street views uploaded by users, and various location and map data such as GIS latitude and longitude coordinates. Other data may include approved asset details, including conduit size, number, year, material, configuration, contents, pole, strains, photos of marks and assets with or without geotagging, and chat data such as preselected data and open text, unprocessed photos, and geotag linking. The data store 240 includes non-transitory and non-volatile memory and may be an example of data store 115. The data store 240 may include unstructured data, semi-structured data, and structured data. Unstructured data may include raw data, emails, documents, and files. Semi-structured data may include various artificial intelligence models, machine learning models, and probability processing models, photos, user data and analytics. Structured data may include mapping data, location data, chat data, excavation information, and other data that are converted to structured data by the data mining engine 220. Various suitable data structures such as Structured Query Language (SQL), other relational database structures, and/or NoSQL that uses key-value pairs, wide columns, graphs, inversed indices, tabular stores, or resource description framework (RDF) may be used in the data store 240.

A map generator 250 may correspond to various sets of software instructions stored in a memory that are executable by a processor. The map generator 250 generates a digital map that includes digital ground marks. The digital ground marks correspond to physical ground marks (e.g., paints on the ground) that are captured in images of street views and whose location data is determined by the ground mark location determination engine 230. The map generator 250 may generate a base map based on data from any suitable GIS map providers, such as ESRI and OPENSTREETMAP. The map generator 250 overlays utility line information such as the digital ground marks and other excavation and construction information on the base map. For example, the symbols, colors, numbers, and characters of physical ground marks may be reproduced digitally at the same location in the digital map using the same symbols, colors, numbers, and characters. The computing server 110 may transmit the location data of the ground marks for display in the digital map that includes the digital marks of the utility lines as part of a GUI of an application 122 of the computing server 110. An example of a conceptual diagram of the GUI that includes a digital map will be discussed in further detail below with reference to FIG. 6.

A probability processing model 260 may be a machine learning model, a statistical model, an algorithm, or a combination of those that are used to determine probabilities that the location data of ground marks are accurate. The probabilities may be provided to the users as part of the information that can be displayed in digital maps. The ground mark location determination engine 230 determines the location of a ground mark. The determined location may be confirmed or contradicted based on other data sources. For example, the location may be determined by comparing the location of the benchmarks presented in a screenshot of the street view based on GIS information. A user may manually take a photo of the street view when the user is physically present at the site. The user may also provide manual feedback on whether the location data of the ground mark determined by the ground mark location determination engine 230 is correct or not, such as by confirming whether the paint on the ground is still present. A utility company may also have a record of the utility location, whose description may be in line with or contradictory to the determined location data. During an excavation project, a worker may also manually confirm that whether the underground utility line is actually found based on the digital mark provided by the computing server 110. Those are example factors that may increase or reduce the probability that the location data of a ground mark is accurate or not. In one example, the probability may be determined based on the number of data sources that are in agreement with the determined location data.

The probability processing model 260 may use one or more machine learning algorithms, such as a regression model, a support vector machine, a random forest model, and a neural network, to determine the probability that the location data of a ground mark is accurate or not and assign a score (such as a score from 1 to 10) to describe the accuracy. The machine learning algorithms may be trained by a training set that includes various training samples. Each training sample may be digital ground marks whose location data is confirmed to be accurate or inaccurate. For example, a positive training sample may be associated with a label "accurate" and a negative training sample may be associated with a label "inaccurate." Alternatively, the training samples may also be labeled with a scale on the accuracy. Each training sample may be associated with different characteristics, such as whether the location data is supported by a photo of the site, whether there is a manual confirmation of the location from a worker, whether the location data contradicts the utility company's record, etc. Based on the characteristics and the labels of the training samples, a machine learning model may be trained. Detail of an example training process of a machine learning model will be further discussed with reference to FIG. 7.

A communication engine 270 estimates communications between the computing server 110 and various entities that communicate with the computing server 110. The entities that communicate with the computing server 110 may include users, utility companies, government agencies, and other organizations. For example, utility companies may provide records of utility line information to computing server 110. The computing server 110 determines accurate location data of the utility line and feeds the information back to the utility companies. The communication engine 270 may establish and coordinate real-time communication among entities that use the computing server 110. For example, the communication engine 270 may estimate live chat and video live stream between a utility company and excavation workers at the excavation site. The communication engine 270 may use different communication protocols, such as packet switching, TCP/IP, emails, etc. to communicate with various entities. The computing server 110 may have agreed communication protocol with various utility companies and government agencies. The communication engine 270 may include algorithms for various communication protocols and standards, encoding, decoding, multiplexing, traffic control, data encryption, etc. for various communication processes.

An application program interface (API) 280 of the computing server 110 exchanges data with various entities through computer code and programming language so that the exchange of information can be automated and conducted in a much fast manner. The API 280 may be for inbound information or for outbound information. For example, for inbound information, the computing server 110 may transmit various calls and requests to the API of third-party data sources such as a GIS data and map source 130 to request GIS data in a large batch. For outbound information, the computing server 110 may receive calls and requests from utility companies or users for location data. The API 280 may be in compliance with any common API standards such as Representational State Transfer (REST), query-based API, Webhooks, etc. The data transferred through the API 280 may be in formats such as JavaScript Object Notation (JSON) and Extensible Markup Language (XML).

A front-end interface engine 290 may provide an interface to transmit and display results, data, and digital maps generated by the computing server 110. For example, data related to utility lines, excavations, and constructions in an area may be visualized as a digital map. The front-end interface engine 290 may be in the form of a graphical user interface (GUI) to display the digital map and allow users to provide inputs via the GUI. A user may input manual actions and feedbacks through one or more chat boxes in the GUI. For example, a user may select a digital ground mark on the digital line and provide feedback that the corresponding utility line paint is still present or no longer present in the site. The front-end interface engine 290 may take different forms. In one embodiment, the front-end interface engine 290 may control an application 122 that is installed in a user device 120. For example, the application 122 may be a cloud-based SaaS or a software application that can be downloaded in an application store (e.g., APPLE APP STORE, ANDROID STORE). The front-end interface engine 290 may be a front-end software application that can be installed, run, and/or displayed at a user device 120 for users. The front-end interface engine 290 also may take the form of a webpage interface of the computing server 110 to allow users to access data and results through web browsers. In another embodiment, the front-end interface engine 290 may not include graphical elements but may provide other ways to communicate with a user, such as through APIs.

Example Excavation Information Provider Process

Figure 3:
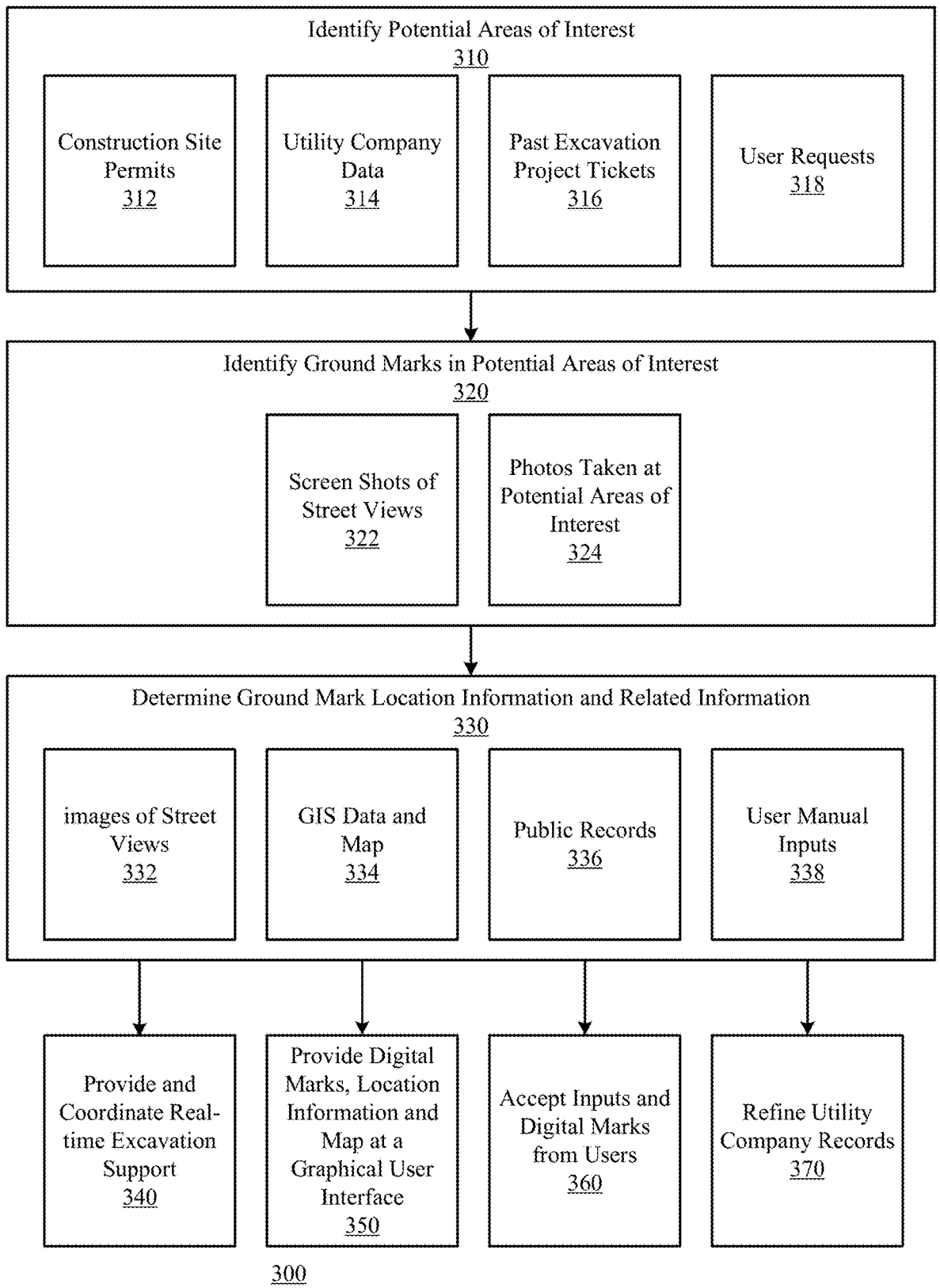
FIG. 3 is a flowchart illustrating an example process for providing excavation related information, in accordance with some embodiments.

FIG. 3 is a block diagram illustrating an example process 300 for providing excavation related information, in accordance with some embodiments. The process 300 may be performed by a computer such as the computing server 110 using one or more components discussed in FIG. 2, including the ground mark recognition engine 210, the data mining engine 220, and the ground mark location determination engine 230. A computer may be a single operation unit in a conventional sense (e.g., a single personal computer), a set of distributed computing devices that cooperate to execute a set of instructions, a Cloud computing device, a container, or a virtual machine. While the rest of the discussion in FIG. 3 will be described in association with the computing server 110 in a singular form, the computer or the computing server 110 here may include one or more computing devices.

In some embodiments, in collecting various excavation-related data, the computing server 110 may identify 310 potential areas of interest. There can be an enormous number of ground marks in a country and the capturing of those ground marks can be a humongous task. In some embodiments, the computing server 110 may focus on certain areas by identifying 310 potential areas of interest to look for those ground marks to build a database of the excavation-related data and to update the database. For example, the computing server 110 may rely on public information and licensed data to identify areas of interest that are likely to include those ground marks. The identification 310 of the potential areas of interest may be performed by the data mining engine 220 to parse addresses that are associated with past constructions, past excavation projects, and utility line locations.

By way of example, the computing server 110 may retrieve construction site permits 312 from a public information source 160. Construction site permits 312 are usually public information and include the addresses of the sites. The computing server 110 may also receive utility company data 314 from a utility company data source 170. The utility company data 314 may include a rough description of the location of utility lines. The computing server 110 may also receive past excavation project tickets 316 from a utility location ticket server 150. A location with a past excavation project is more likely to have excavation marks and utility line mark on the ground. The computing server 110 may also receive user requests 318 for ground mark information for particular addresses or areas. Based on the information in the construction site permits 312, the utility company data 314, the past excavation project tickets 316, and the user requests 318, the computing server 110 may identify addresses of areas of interest.

While the construction site permits 312, the utility company data 314, the past excavation project tickets 316, and the user requests 318 are discussed as example sources of data for a computing server 110 to identify potential areas of interest, other sources of data are also possible for the computing server 110 to identify potential areas of interest. A computing server 110 may also rely on only one or more types of data from the construction site permits 312, the utility company data 314, the past excavation project tickets 316, and the user requests 318 to identify 310 potential areas of interest. In some cases, the potential areas of interest may be identified without any other data sources. The computing server 110 may designate certain popular areas such as crowded urban areas as potential areas of interest. For example, the computing server 110 may blanketly designate the entire Los Angeles county as potential areas of interest.

The computing server 110 may identify 320 ground marks in the potential areas of interest. Based on various information, the computing server 110 identifies the addresses of potential areas of interest. The computing server 110 may collect images of street views of the potential areas of interest. The collection of images may be conducted in several different ways. For example, first, the computing server 110 may collect screenshots 322 of street views by parsing screenshots from the digital map server 140 that often provides those street views for free. The computing server 110 may activate a street-view mode of a digital map at the address. For instance, the computing server 110 may visit a popular map website such as GOOGLE MAP to capture a screenshot of the street-view mode at the address. Second, the computing server 110 may receive actual photos 324 taken at potential areas of interest. The computing server 110 may receive the actual photos 324 by having employees or retaining contractors to visit the potential areas of interest to take the photos. The computing server 110 may also invite end users, such as excavation workers, to manually take photos 324 of ground marks at the potential areas of interest. The computing server 110 may also crowdsource the collection of those photos 324 in various areas. From the photos 324, the computing server 110 may use the ground mark recognition engine 210, which may include one or more object recognition algorithms, to identify ground marks in the potential areas of interest.

The computing server may determine 330 ground mark location data and related information based on the identified ground marks in the potential areas of interest. The identification of ground mark location may be performed by the ground mark location determination engine 230. The computing server 110 may rely on images of street views 332, which include screenshots of street views 322 and photos 324 taken at potential areas of interest, to identify ground marks. The computing server 130 may also receive GIS data and map 334 from a GIS data and map server 130 and public records 336 from one or more public information sources

160. The GIS data and map server 130 and public records 336 may include survey-accurate location data of various benchmarks such as properties lines, streetlights, traffic lights, railroad tracks, public trees, etc. that can be served as the reference points for the determination of the accurate location data of the ground marks. The computing server 110 may also rely on user manual inputs 338 to confirm, supplement, correct, adjust, and delete the location data of ground marks and utility lines. For example, an excavation worker may confirm that the location data of a ground mark is accurate and an underground utility line that matches the data provided by the computing server 110 is found at the location. The excavation worker may supplement the location data by manually entering the depth information of the utility line. The computing server 110 may also supplement the ground mark information by providing records from utility company data 314 and past excavation project tickets 316.

The computing server 110 provides various excavation support to different entities and customers. For example, the computing server 110 may provide and coordinate 340 real-time excavation support to users, such as excavation workers. A user may communicate to the computing server 110 through an application 122 of the user device 120. A user may provide real-time feedback on the information provided by the computing server 110. For example, a user may notify the computing server 110 that a ground mark is not found at the supposed location. The computing server 110 may also connect the user to a utility company's operator. In cases where the user is not able to locate the utility line that is supposed at a location, the user may communicate to the utility company through live chat. In some embodiments, the computing server 110 may also provide a live conference that connects the user at the excavation site to a utility company so that the utility company may provide guidance and sometimes supervision on the excavation of certain sensitive location or at a location near a potentially dangerous utility line (e.g., a gas pipe).

The computing server 110 may provide 350 digital marks, location data of utility lines, and digital maps to be displayed at a GUI for users to more easily locate utility lines before excavation. For example, ground marks in the past may have been faded or removed due to new pavement of the ground. The computing server 110 may preserve records of past ground marks and provide digital marks of the utility lines on digital maps. The computing server 110 may display the digital marks using the same color, symbol, and information of the ground marks at the locations in the digital map that correspond to the actual locations of the ground marks. The computing server 110 may also provide the location data of the ground marks in the form of GPS data. The GUI may also provide other information that might be important to excavation, such as utility company records and past excavation tickets. The GUI may also provide depth information of a utility line. The GUI may further provide an estimate of a probability that the location data of a utility line is accurate. The probability may be determined by the probability processing model 260, as discussed above with reference to FIG. 2.

The computing server 110 may also accept 360 inputs and digital marks from users. The GUI may allow users to provide inputs, which may include photos of actual street views and ground marks and manual inputs. The manual inputs may be related to feedbacks and confirmations of information provided by computing server 110. The GUI may also allow users to digitally enter ground marks, such as excavation marks and utility line marks, on the digital map provided the computing server 110. The computing server 110, in turn, saves the digitally-entered ground marks and displays the digital marks for other users. For example, the excavation site may be required by law to be marked on the ground for a few days before any digging begins. In addition to physically marking the ground, excavations workers may also digitally mark the ground, in the same manner, using the digital map at the GUI and take photos of the physical marks. The computing server 110 store the digital marks and associate those digital marks with the photos uploaded. The computing server 110 may also invite the worker, at the site, to stand nearby (e.g., directly on top of or in close proximity) the ground mark and capture a GPS location of the ground mark using a GPS enabled mobile device, such as a smartphone. The computing server 110 may immediately transmit the digital mark to the utility location ticket server 150 (e.g., 8-1-1 call center) and relevant utility companies. Likewise, after utility company workers installed new utility lines and marked the ground with utility line marks, the workers may create equivalent digital marks on the digital map, take photos of the physical ground marks, capture GPS locations of the marks, and enter specification information of the ground marks through the GUI.

The computing server 130 may also refine 370 utility company records. For example, a utility company may provide records of specification and rough location data of utility lines to the computing server 130. Based on the records, the computing server 130 identifies 310 potential areas of interest, identifies 320 the ground marks corresponding to the utility company's records, and determines 330 accurate locations of the ground marks. The computing server 130 may also receive the GPS locations of the ground marks by inviting workers, at the site, to stand nearby the ground marks to capture the GPS locations. The computing server 130 may refine the locations of data of the ground marks using the GPS locations. The determined location data and, potentially, the further refined location data may be used to augment the information regarding the utility lines shown in the records of the utility company. The computing server 110 provides the augmented information to the utility company.

Example Process for Determining Mark Location Data

Figure 4:
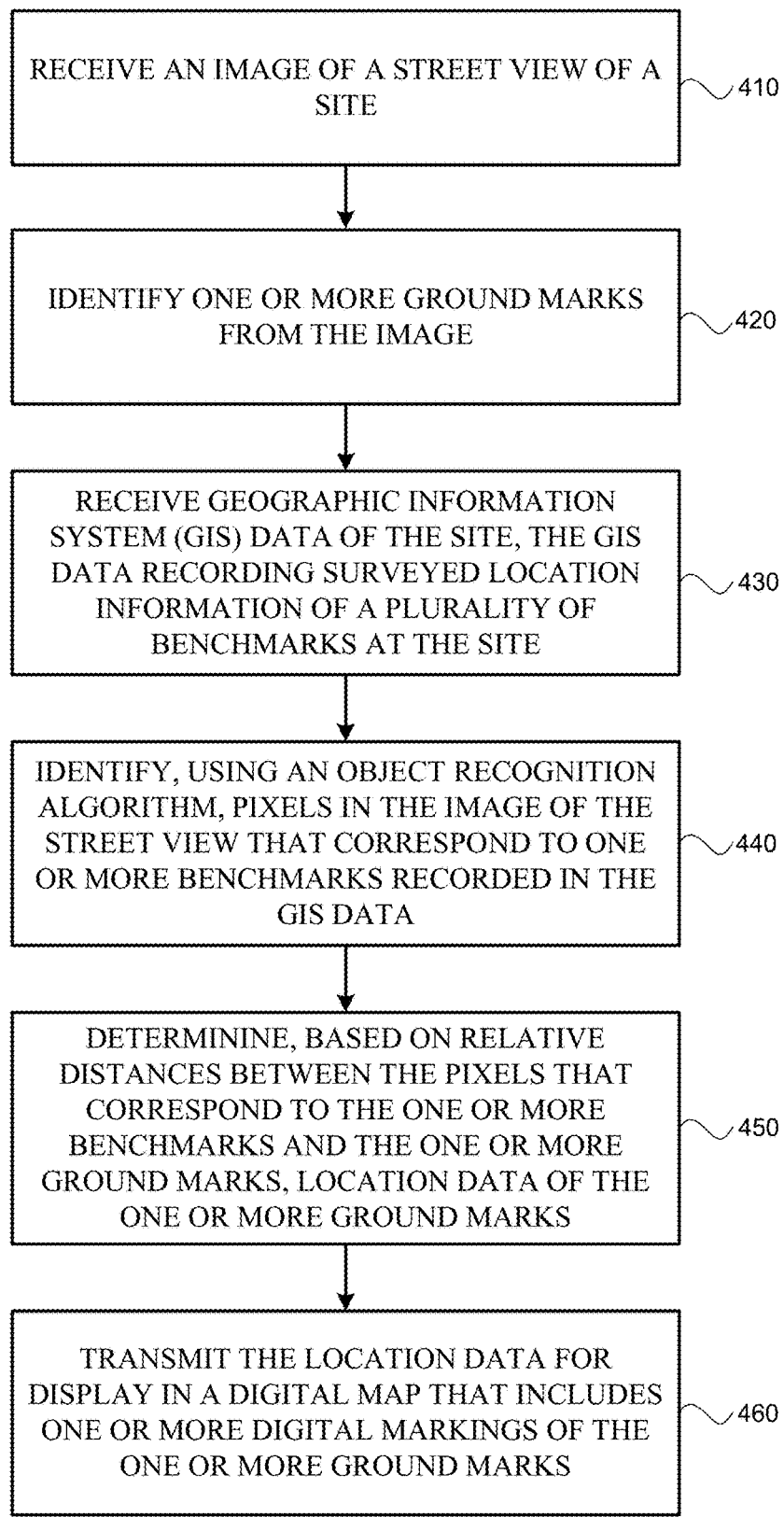
FIG. 4 is a flowchart illustrating an example process for determining location data of ground marks at a site, in accordance with some embodiments.

FIG. 4 is a flowchart that depicts an example process 400 for determining location data of ground marks at a site, in accordance with some embodiments. The process 400 may be implemented by a computer, which may be a single operation unit in a conventional sense (e.g., a single personal computer) or may be a set of distributed computing devices that cooperate to execute a set of instructions (e.g., a virtual machine, a distributed computing system, Cloud computing, etc.). In one case, the computer may be a computing server 110 that may include memory and a processor (e.g., one or more processors). The memory may store computer code that includes instructions. The instructions, when executed by the processor, cause the processor to perform various steps described herein. Also, while the computer is described in a singular form, the computer that performs the process in FIG. 4 may include more than one computer that is associated with the computing server 110.

Figure 5A:
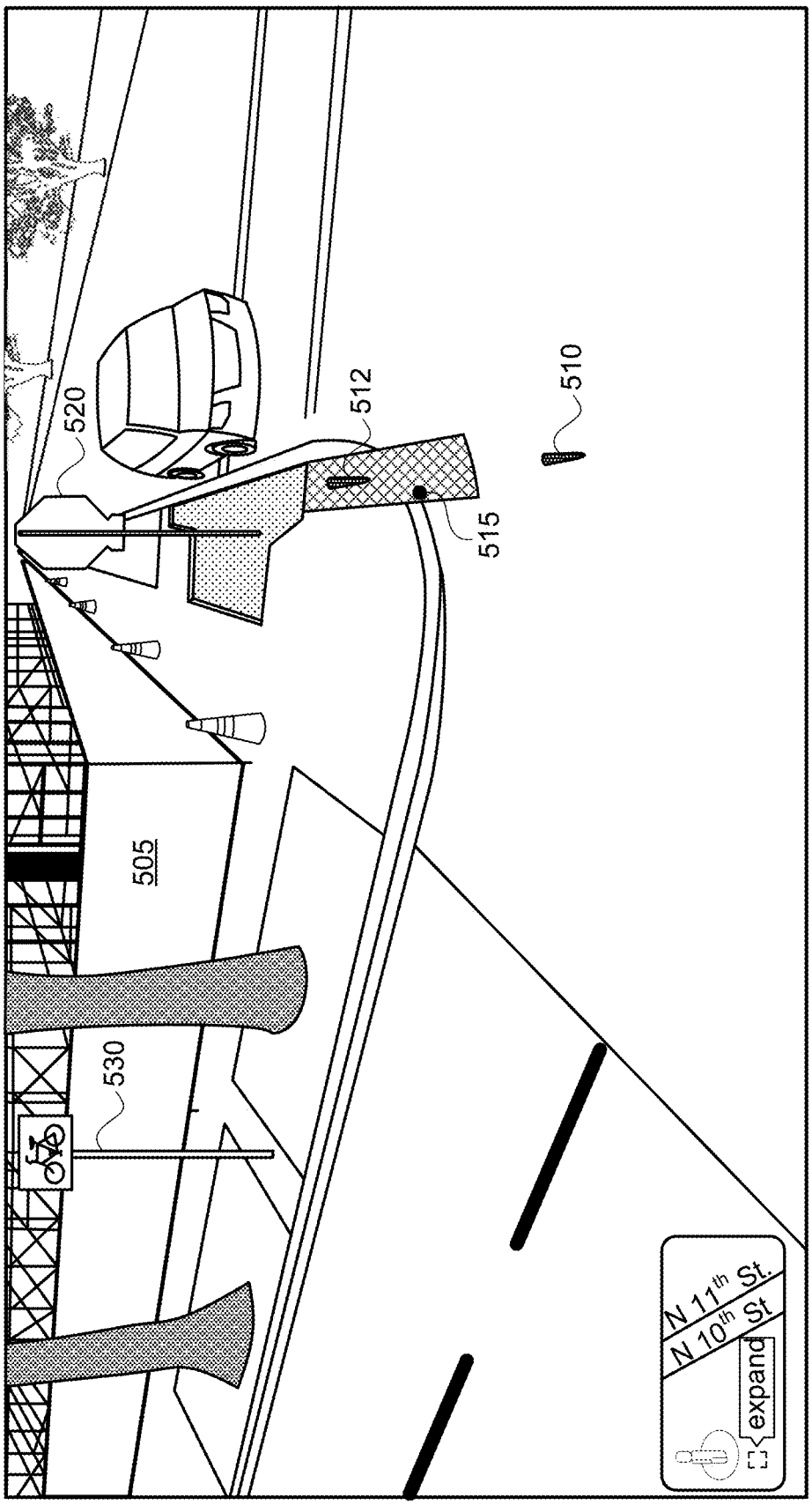
FIG. 5A is a conceptual diagram illustrating an example screenshot of a street view, in accordance with some embodiments.
Figure 5B:
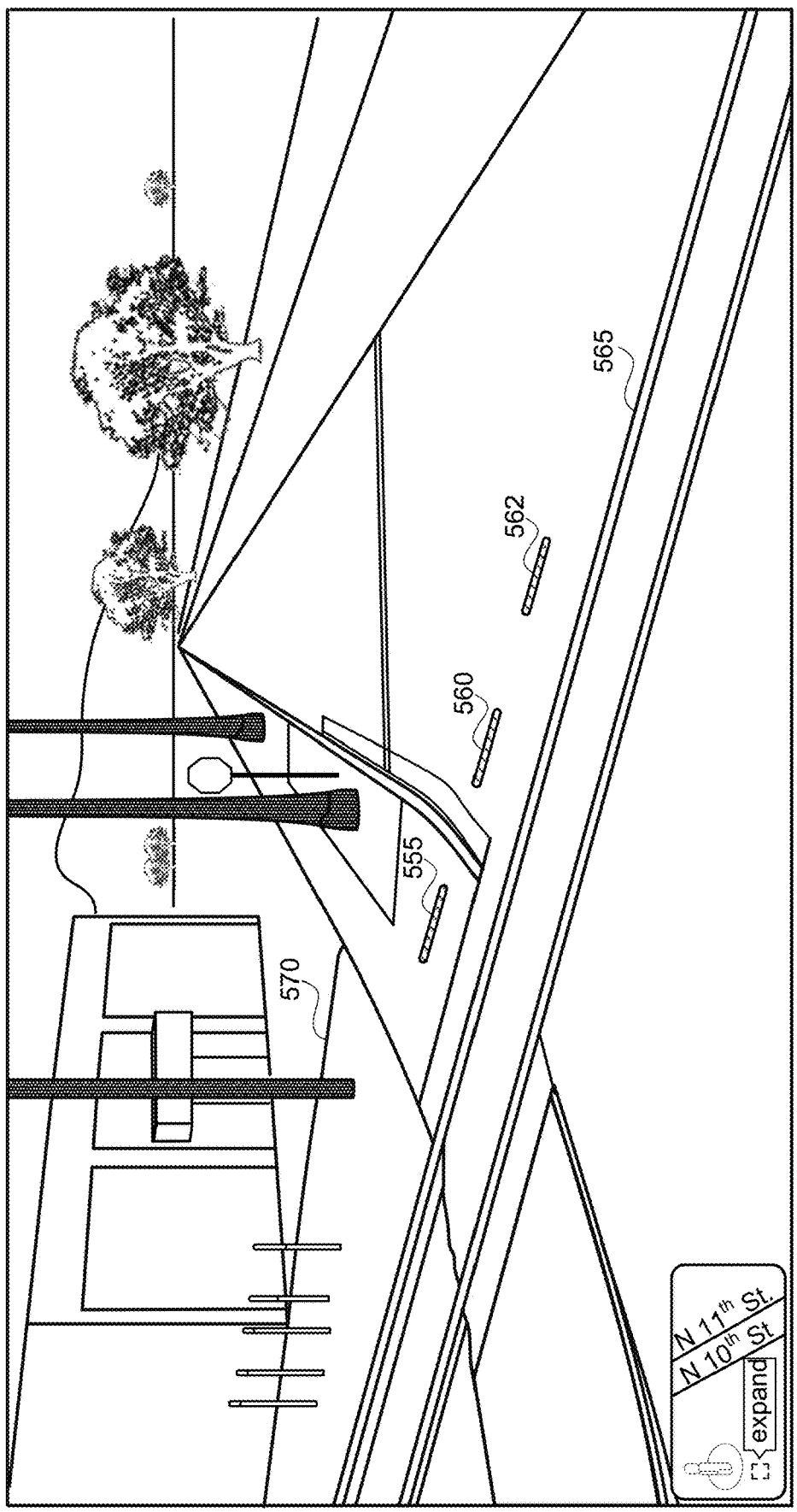
FIG. 5B is a conceptual diagram illustrating an example screenshot of a street view, in accordance with some embodiments.

FIGS. 5A and FIG. 5B are conceptual diagrams of two images 500 and 550 of street views of different sites, in accordance with some embodiments. The process 400 and the images 500 and 550 will be discussed in conjunction with each other in illustrating process 400.

In accordance with some embodiments, a computing server 110 may receive an image of a street view of a site

410. For example, the image may be a screenshot of a street-view mode of a digital map downloaded by the computing server 110 based on an area of interest identified by reviewing construction site permits 312, utility company data 314, or past excavation project tickets 316, by receiving a user request 318, or by identifying a common urban site. Other ways of identifying an area of interest are also possible. For example, the computing server 110 may randomly scan through various locations using the street-view mode provided by a digital map server 140. The computing server 110 uses an object recognition model to identify potential construction sites, such as a construction site 505 shown in image 500 of FIG. 5. In response to identifying a construction site 505, the computing server 110 may regard the nearby area as a potential area of interest. In addition to, or alternative to, a screenshot of a street-view mode of a digital map, the image may also be a photo taken by a user in the area of interest. For example, a user may take a photo of a ground mark and upload the photo to the computing server 110 through application 122. Other ways to obtain an image of a street view is also possible. Images 500 and 550 shown in FIGS. 5A and 5B are conceptual diagrams of the example images of street views. While a site is often an urban site, a site may be any suitable location that has ground marks for utility lines, excavation, or other construction, whether the site is rural or urban.

The computing server 110 may identify 420 one or more ground marks from the image of the street view. For example, in image 500, two ground marks 510, and 512 that are generally parallel to curbside may be identified. In image 550, a series of ground marks 555, 560, 562 that are generally parallel to a railroad track 565 may be identified. The computing server 110 may use one or more object recognition algorithms, such as the ones associated with ground mark recognition engine 210, to identify the ground marks. The computing server 110 may also identify the color of the ground marks so that the computing server 110 distinguishes different types of marks. For example, white marks are for proposed excavation, pink marks are temporary survey marks, yellow marks are for gas, blue marks are for water, etc. The computing server 110 may segment the pixels in the image corresponding to the identified ground marks from the rest of the environment. Those pixels may be marked with labels different from the environment. For example, the pixels corresponding to the ground marks may be labeled as "1" while the rest of the environment may be labeled as "0." The computing server 110 may also use one or more text or symbol recognition algorithm to extract the text and symbols of the ground marks, such as arrows, stripes, circles, utility company names, and information related to the specification of the utility lines.

The computing server 110 may receive 430 geographical information system (GIS) data of the site. The GIS data may record surveyed location data of a plurality of benchmarks at the site. With the address of the image of a street view, the computing server 110 may retrieve a GIS map of the same location from a GIS data and map server 130. The map may include some survey-accurate location data of certain benchmarks such as property lines, streetlights, street signs, street intersections, gutters, railroad tracks, storm drains, and public trees. Besides retrieving information from the GIS data and map server 130, the computing server 110 may also receive GIS data from other sources such as public information sources 160 that may provide APN information that may include the survey-accurate location of property lines. The GIS data may provide geolocation data (e.g., GPS data) of the benchmarks. The geolocation data may be in any suitable location formats such as those providing latitude and longitude or degrees, minutes and seconds (DMS). The GIS data received by the computing server 110 may also include a GIS map of the same location of the image of the street view.

The computing server 110 may identify 440 pixels in the image of the street view that corresponds to one or more benchmarks recorded in the GIS data. For example, GIS data may include location data of the intersection 515 of the two streets and the street sign 520 (e.g., a stop sign) in the image 500. GIS data may also include location data of the railroad track 565 and the property line 570 between a private property and the public street. Based on the location data of benchmarks provided in the GIS data, the computing server 110 may identify the corresponding benchmarks presented in an image of the street view. For example, from the GIS map, the computing server 110 knows that image 500 should include a street intersection 515 and a street sign 520. the computing server 110 may roughly align the orientation of the GIS map and the orientation of the image 500 of the street view. The computing server 110 may use an object recognition algorithm to identify the corresponding benchmarks (e.g., the street intersection 515 and the street sign 520). The object recognition algorithm may be part of the ground mark location determination engine 230. The object recognition may include a convolutional neural network (CNN) that is trained to identify pixels corresponding to the benchmarks recorded in the GIS data. The computing server 110 may segment the pixels in the images corresponding to the benchmarks recorded in the GIS data from the rest of the environment. For example, the pixels corresponding to the benchmarks may be labeled as "2" while the rest of the environment may be labeled as "0." The computing server 110 may use one or more contouring and/or filtering techniques to segment the pixels corresponding to the benchmarks. For example, in image 500, the back of the octagonal street sign 520 has a color tone that is different from the rest of the environment. Likewise, in image 550, the rails of the railroad track 565 also have a color tone that is different from the ground. The computing server 110 may identify the boundary of the benchmarks based on pixel values (e.g., RGB values, color and light intensity) and create a contour of the benchmarks in order to segment the benchmarks from the rest of the environment.

The object recognition algorithm used to identify the benchmarks in an image of the street view may include one or more machine learning models such as a CNN. The training of the machine learning model may include a training set that includes various training samples. Each training sample may be an image of a street view with a known benchmark that is manually labeled by the type of benchmark. For example, a training subset for recognizing a street sign may include hundreds or thousands of images of various street signs. A training subset for recognizing railroad tracks may include hundreds or thousands of images of railroad tracks. Each training sample is labeled with the benchmark(s) included in the training sample. The training of the machine learning model used for object recognition may include, using the training sets, an iterative approach to gradually improve an objective function that signifies the performance of the machine learning model. The machine learning model may include multiple layers and each layer may have multiple nodes (e.g., neurons in a neural network). The layers and the nodes may be associated with multiple kernels, coefficients, and weights that can be adjusted. Training the machine learning model may include forward propagation and back propagation. In forward propagation, the machine learning model relies on the values of the kernels, coefficients, and weights in the current iteration to make predictions of the training samples' labels. For example, the computing server 110 may input the training image that includes a street sign for the machine learning model to make a prediction on the benchmark included in the training image. The prediction of the machine learning model is then compared to the actual label of the training image. The objective function may be a loss function that determines how well the machine learning model makes predictions for the overall training set (e.g., how many correct predictions out of a set of training samples) in a given iteration. In back propagation, the computing server 110 uses techniques such as coordinate descent to adjust the values of the kernels, coefficients, and weights in a direction that is projected to improve the value of the object function. In the next iteration, forward propagation is executed again to make a new round of predictions using the newly adjusted values of the kernels, coefficients, and weights. Forward and back propagations are executed in multiple iterations to continue to improve the performance of the machine learning model. Training may be completed when the model converges (e.g., the value of the objective function becomes stable within a threshold range) or after a predetermined number of iterations. The kernels learned in the training process often related to various features or summaries that are associated with attributes or shapes of certain benchmarks. Further details of example structure and training of a machine learning model are described in FIG. 7.

The computing server 110 may determine 450 location data of the one or more ground marks. The determination 450 may be based on relative distances between the pixels that correspond to the one or more benchmarks and the one or more ground marks. For example, in image 500, the computing server 110 may determine the relative distance (e.g., in terms of the number of pixels) and direction between the street sign 520 and the ground mark 510 and also the relative distance and direction between the ground mark 510 and the street intersection 515. From the GIS data, the computing server 110 also knows the coordinate data of the street sign 520 and the street intersection 515. Based on the coordinate data of the street sign 520 and the street intersection 515, the location data (e.g., in the form of coordinates) of the ground mark 510 can be determined based on image transformation techniques and other mathematical operations. Likewise, in image 550, the computing server 110 may determine that the ground marks 555, 560, and 562 are parallel to the railroad track 565. In image 550, the computing server 110 may determine the relative ratio of distances (e.g., in terms of the number of pixels) between the ground marks 555, 560, and 562 and the railroad track 565 and between the ground marks 555, 560, and 562 and the property line 570. From the GIS data, the computing server 110 also knows the coordinate data of the railroad track 565 and the property line 570. Based on the coordinate data of the railroad track 565 and the property line 570, the location data of the ground marks 560 can be determined.

In some embodiments, the GIS data received by the computing server 110 may include a GIS map. The computing server 110 may overlay the GIS map with the image of the street view based on one or more benchmarks appearing in both the GIS map and the image of the street view. For example, for image 500, the computing server 110 may identify the corner of the two streets' curbsides, the bike lane street mark 530, and the stop sign 520 in both the GIS map and the image 500 of the street view. The computing server 110 may rotate and transform either or both the GIS map and the image 500 of the street view so that both the GIS map and the image 500 have the same perspective.

In determining 450 the location data of the ground marks, one or more image processing techniques may be used. For example, the computing server 110 may use image processing techniques such as image transformation, point matching, homograph, projective geometry, affine transformation, scaling, reflection, rotation, and vector projection to adjust the perspective of the image of the street view. Homography can be used to compute a homography matrix that relates the transformation between two or more planar images (e.g., the GIS map and the image of the street view) that are projected on different planes. In some embodiments, the computing server 110 may also go to the street-view mode provided by the digital map server 140 to capture additional screenshots of the street view of the site from different perspectives so that the computing server 110 include sufficient image transformation data to adjust the perspective of the image of the street view in order to determine the location data of the ground marks.

The computing server 110 may transmit 460 the location data to a client device for display in a digital map that includes one or more digital markings of the one or more ground marks. An example GUI that displays the digital map will be discussed in further detail with reference to FIG. 6. The GUI may be part of the application 122 that is used by a client device 120. The computing server 110 may also ask users to confirm the determined location data. For example, the computing server 110 may provide the location data of the ground marks to a user through the application 122. In the application 122, the computing server 110 may invite the user, at the site, to stand nearby the ground mark and capture an image of the ground mark and GPS location of the ground mark using a GPS enabled mobile device such as a smartphone. The computing server 110 receives the GPS location of the ground marks and refines the location data of the ground marks using the received GPS location.

Example Graphical Representations of Process Models

Figure 6:
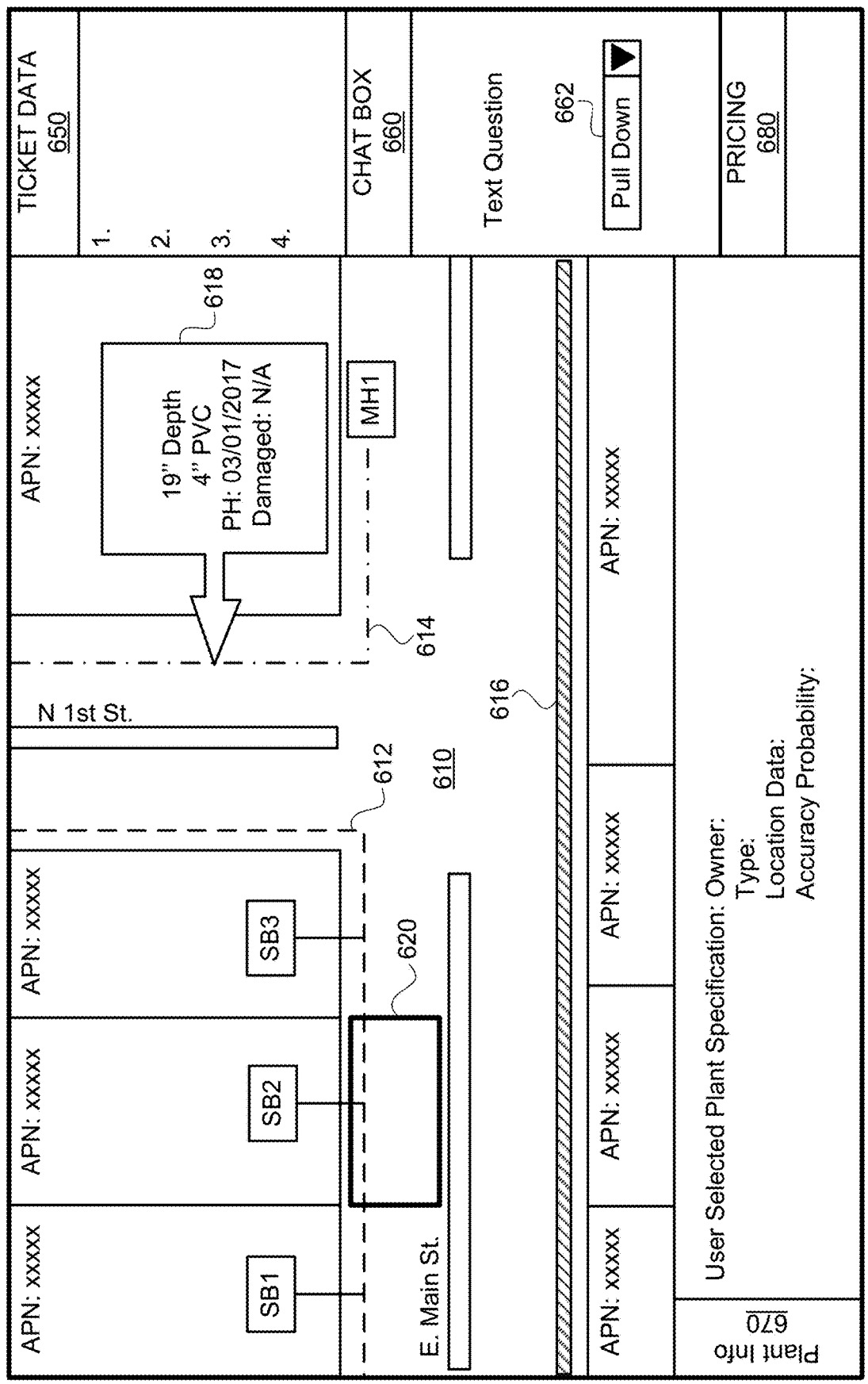
FIG. 6 is a conceptual diagram illustrating an example graphical user interface showing a digital map that includes utility line and excavation information, in accordance with some embodiments.

FIG. 6 is a conceptual diagram 600 of a graphical user interface (GUI) 600 provided by a computing server 110, in accordance with some embodiments. The GUI 600 may include various fields such as a digital map 610, an excavation project ticket field 650, a chat box 660, a plant information field 670, and a pricing field 680. The layout of the GUI 600 is illustrated in FIG. 6 as an example. In various embodiments, the precise arrangement of various fields may be changed or customizable by the user. Also, one or more fields may be added, removed or modified in various embodiments of the GUI 600.

The digital map 610 may be a GIS map that includes various map data such as street names, street numbers, property lines, APNs, locations of benchmarks, etc. The digital map 610 also includes digital marks of various utility lines and excavation projects. For example, digital mark 612 (represented by a dashed line with the style "- - -") is an example of a phone line. The digital mark 612 may be at the position of ground marks that are captured in images. The precise location of the digital mark 612 may be based on the location data of the ground marks determine in process 400. In some embodiments, the digital mark 612 may also be longer than the ground marks. The computing server 110 may rely on other information sources such as utility company data source 170 to extrapolate the direction and length of the ground marks to project the location of digital mark 612. In some cases, the computing server 110 may also make assumptions to the utility line such as by assumption the utility line continues to run parallel to the curb if the corresponding ground marks agree to this assumption. The digital map 610 may also show the locations of sub-terrain boxes (SB1, SB2, SB3, etc.). In the example digital map 610 shown in FIG. 6, there are two additional types of digital mark 614 (represented by a dashed line with the style "- -") and digital mark 616 (represented by a thick shaded line). The digital mark 614 may represent a power line that is connected to a transmission box MH1 and the digital mark 616 may represent a gas pipe.

The styles of the digital marks 612, 614, and 616 (e.g., dashed lines, shaded lines) are shown in FIG. 6 for illustration only. In the actual embodiments of a GUI 600, the styles of digital marks may follow the styles of the ground marks. For example, the digital marks may have the same colors as their corresponding ground marks. Also, the digital marks may use the same symbols and include the same textual information as the ground marks that are captured by images of street views. Also, the digital map 610 may also include digital symbols for utility potholes (not shown as examples in FIG. 6).

The digital map 610 may include various control elements or interactive elements. In some embodiments, the digital marks 612, 614, and 616 may be clickable. For example, when a user clicks on the digital mark 614, a pop-up window 618 may be displayed to show additional specification information of the utility line such as the depth of the utility line, the specification of the utility line (e.g., 4" PVC), the last updated date, whether there is evidence or a record that the utility line is damage, etc. The computing server 110 may invite the users at the site (e.g., site workers) to provide the depth information of the utility line. For example, the computing server 110 may incentivize the users to provide the depth information by providing a discount to the digital map 610 if a user locates the utility line at an excavation project and input the depth information. The computing server 110 stores, in a data store, the depth information of the utility line, which may correspond to a ground mark. The computing server 110 can transmit the depth information for display for future users. In response to a user clicking on one of the digital line marks, the GUI 600 may also fill more detailed specification information in the plant info field 670. Example information in the plant info field 670 may include the owner of the utility line, the type of utility line, detailed specification of the utility line (e.g., conduit size, material, depth, age, encapsulation), the location data (of the utility line and/or relevant potholes) such as in the format of latitude and longitude, and accuracy probability that is determined by the probability processing model 260. The accuracy probability provides an estimate of how accurate the position of the digital mark, the data of the utility line, and/or the location data is accurate based on the corroboration or contradiction of various data analyzed by the computing server 110.

The GUI 600 may also allow users to input data, digital marks, and other symbols on the digital map 610. For example, in addition to painting excavation marks on the ground, a user may also digitally mark the corresponding excavation boundary on the digital map 610. For instance, the user may draw a digital excavation mark 620 that delineates the excavation zone from the rest of the site. The user may also upload photos of the actual excavation marks on the ground that corresponds to the digital excavation mark 620. In some embodiments, the computing server 110 may also invite the user to stand near or at the excavation zone (e.g., at the corners of the excavation zone) to capture one or more GPS location data of the excavation zone. The digital excavation mark 620, corresponding GPS location data, and images of the physical ground marks may be automatically transmitted to utility location ticket server 150 (e.g., 8-1-1 call center) and the relevant utility company (e.g., the utility company that owns the phone line represented by the digital mark 612). In another example, after a worker from a utility company installs a new utility line, the worker may mark the location of the utility line on the digital map 610 by using one or more digital mark. The worker may also upload photos of the corresponding ground marks and provide other data such as GPS location data, specification of the utility line, depth information of the utility line, and other special notes related to the utility line. The worker may also provide the precise GPS location data of the utility potholes.

The ticket data field 650 displays excavation project tickets (e.g., 8-1-1 tickets) that are related to past or ongoing excavation projects that occurred within the area of the digital map. While the tickets are referred to as excavation project tickets, the tickets may include underground service alert tickets. The computing server 110 may transmit information of those tickets for display at the GUI 600 that includes the digital map 610. For each ticket displayed, the user may click on the ticket to pull up additional information on the ticket. The GUI 600 may also allow the users to create an 8-1-1 excavation project ticket and input the information of the upcoming excavation through the GUI 600.

The chat box 660 allows users to communicate with computing server 110. The chat box 660 may be open-ended and/or pre-filled with several common predetermined dialog boxes that can be selected by the pull-down menu 662. Example dialogs include "I cannot find the utility line," "The utility line is damaged," "During excavation, I find something that matches the description of the utility line but not at the suggested location," "I have discovered something that is not marked," "The utility line at the location does not match the specification," "I have measured the depth information of the utility line," etc. Some of the communications may also be open-ended. Using the chat box 660, the computing server 110 may receive one or more text responses from a user at the site. The text responses may concern a condition of a utility line (e.g., present, absent, damaged, according to specification or not, depth, type, thickness). The computing server 110 may augment the location data of the ground marks corresponding to the utility line with the information from the text responses. In some embodiments, the augmented information may be provided to the corresponding utility company. In some embodiments, the chat box 660 may facilitate a live chat between a user and another party such as a utility company. The live chat may be in text, voice, and/or video. The live chat allows the utility companies to provide live support to the excavation projects and monitor the excavation projects remotely for projects that involve more dangerous utility lines such as gas pipes.

The pricing field 680 may provide pricing information to the users for computing server 110 to display various information and provide services to the users. The pricing may depend on the area of the digital map 610 and the area of the excavation mark digitally entered by a user. The computing server 110 may charge the user for forwarding the excavation mark to a utility company and subsequent communication. The computing server 110 may provide a discount to a user if the user provides ground-truth data such as GPS location data of utility line, photos of a ground mark, manual confirmation of the presence of a utility line and its specification, and the depth information of the utility line. The computing server 110 may rely on a pricing polygon to determine the pricing.

Example Implementations and Use Cases

The use of the computing server 110 and the GUI 600 may improve the safety, cost, and efficiency of excavation and construction in various aspects. This section provides some non-limiting example use cases of the application of the services and data provided by the computing server 110.

For utility company engineering users, in one case, users may face the challenge associated with not having the accurate geospatial placement of existing facilities, whether the facilities belong to a third party or self-owned. The computing server 110 may provide geotag of new installs and update records of newly placed facilities. The computing server 110 may geotag existing location marks and pot-holed (day-lighted facilities) and update records. The computing server 110 may give access to geo-placement of third-party facilities with the permission of a third party. In one case, users may face the challenge that engineers may conventionally need to revisit the site. There may not be value-added time to travel or communicate in the field. The computing server 110 may provide live chat communications for field workers with the engineers to mitigate travel time. The live chat may allow adjustments to placement based on real-world geolocation of underground assets.

For utility company records management, in one case, users may face the challenge associated with grossly misrepresented geolocational data logging of facilities in utility company records. The computing server 110 may provide more accurate geotag location data for new installs and update records of newly placed facilities. The computing server 110 may geotag existing ground marks and pot-holed (day-lighted facilities) and update records. Constant flow back and forth from the computer server's 110 database, updating latitude and longitude of company assets. In one case, users may face the challenge associated with the legal requirement to geotag new installations and the associated cost of persons/system to record, process and housing data. The computing server 110 may provide application 122 for utility company records management and, in some cases, free of cost.

For utility inspection, in one case, users may face the challenge associated with the cost of inspection such as the no value added for engineer or inspector to spend to travel to site and conduct inspection. The computing server 110 may provide geolocational tagging of newly placed assets and geotagging photos of placement to verify as-built per requirement. In one case, users may face the challenge associated with delays from routine process inspections and delays incurred from unforeseen field issues. The computing server 110 may provide live chat communications, photo sharing and geotagging of assets between field, engineering and inspections to offer mitigation without field visit and extended delay.

For utility company field users, such as utility company field technicians, users may face the challenge associated with unreliable facility maps with no geospatial accuracy, delays and misrepresented locations. The computing server 110 may provide access to accurate geotagged assets, recording of previous marks, and geotagging damage investigations. In one case, users may face the challenge associated with 48-hour delay in notice and response to concerns related to locating a utility line. The computing server 110 may provide live chat function between excavator and locator. In one case, users may face the challenge associated with inconsistencies in excavation area of a proposed dig. The computing server 110 may provide a graphical representation of intended dig location and chat function for the users to communicate concerns.

For repair technicians, in one case, users may face the challenge associated with repair costs from access delays with no geolocation of assets to locate plant trouble. Technicians often need to investigate, using trial and error, to pin-point asset geolocation. The computing server 110 may provide geotagged assets used to locate buried facilities prior to digging and aerial assets when line-of-site not viable.

For line crews such as outside plant technicians, in one case, users may face the challenge associated with tracking wall-to-wall distances to determine cable lengths required. The computing server 110 may provide geotagging conduit and box placement gives accurate lengths of sections. In one case, users may face the challenge associated with accessing rugged terrain to pinpoint the asset location for repair. The computing server 110 may provide geotagging assets to increase the certainty of location. In one case, users may face the challenge associated with reporting and correcting records of assets geo-placement. The computing server 110 may provide geotagging assets corrects records.

For utility excavation crews, in one case, users may face the challenge associated with excavation crews needing to locate inhouse underground assets increases time to completion of work. The computing server 110 may provide geotagged assets on-site to mitigate locate delay. In one case, users may face the challenge associated with reporting back to engineering delayed and inaccurate or do not include geolocation updates. The computing server 110 may provide work completed reports automatic with geotagging of newly built and repaired assets, thereby increasing accuracy and lowering no value-added time. In one case, users may face the challenge associated with a two-day delay for emergencies. The computing server 110 may provide a geotagged live map to give field crew reliable locations of third-party assets.

For utility contract technicians, such as locators, in one case, users may face the challenge associated with unreliable facility maps, no geospatial accuracy, and delays and misrepresented locations. The computing server 110 may provide accessing geotagged assets, recording of previous marks, and geotagging damage investigations. In one case, users may face the challenge associated with 48-hour delay in notice and response to concerns related to locations of the utility line. The computing server 110 may provide live chat function between excavator and locator with some preselected text. In one case, users may face the challenge associated with inconsistencies in the excavation area of the proposed dig. The computing server 110 may provide a graphical representation of intended dig location and chat function to communicate concerns. In one case, users may face the challenge associated with obtaining current utility client maps delayed and faulty. The computing server 110 may provide live map data that keeps client maps updated.

For utility contract excavator engineering, records management and inspection, in one case, users may face the challenge associated with geo-placement of existing as-builts inaccurate causing delays in design and engineering. In one case, users may face the challenge associated with pre-engineering excavation delayed by third-party utility as-built and records delays and inaccuracies. In one case, users may face the challenge associated with reporting back to utility clients of placement issues and final geolocational placement delayed and inaccurate. The computing server 110 may provide a live chat system, live mapping update to remove delay and inaccuracy. In one case, users may face the challenge associated with maintaining in-house company records costly. The computing server 110 may provide enterprise account gives full access to all contributed data, per contract with the utility company. In one case, users may face the challenge associated with the reengineering of excavation plan due to unforeseen mapping inaccuracies and the cost associated with locating the utility line. The computing server 110 may provide map data of underground assets that prevents improper initial design and optimizes location accuracy. In one case, users may face the challenge associated with inaccuracy of communication of excavation plan and reporting back of final placement to sub-contractors. The computing server 110 may provide an application for sub-contractors to view expected placement and record actual placement of assets and communicate with chat function to mitigate road-blocks. In one case, users may face the challenge associated with inspection of sub-contractor performance cost. When assets are buried, it is extremely challenging to know location and quality. The computing server 110 may provide an audit of photo and chat sharing, along with geotagging of assets, and provide live and time-stamped feedback of sub-contractor performance.

For utility companies and contract locator vendors, in one case, users may face the challenge associated with not being able to access plant records at the time of damage, and no time stamp on inhouse facilities records geotagging. The computing server 110 may provide data that includes known plant installation date, date of geotagging data recorded and displayed (last located/potholed date and time). In one case, users may face the challenge associated with no definitive means to verify if records given to locators. The computing server 110 may provide application 122 as a uniformed mapping platform that displays the same data to risk management and locators across organizations. In one case, users may face the challenge associated with no definitive means to verify if facilities marked on time and accurate. The computing server 110 may provide, rather than the word of mouth or 8-1-1 ticket dispatch data, records documenting access and update uploads.

In one case, users may face the challenge associated with delay and uncertainty in verifying 8-1-1 tickets associated with damage. The computing server 110 may provide an application for the investigator to geographically indicate the area of damage and download known 8-1-1 tickets by locator and known excavator users. In one case, users may face the challenge associated with verifying and maintaining geolocation of prior damages adds expense and geotagging accuracy not reliable. The computing server 110 may provide records from application 122 damage date including 8-1-1 information and geotagged assets involved in a given damage incident. In one case, users may face the challenge associated with field inspection of old damage where marks and damage are covered up or removed, therefore creating long delays and follow-up meetings and inspections. The computing server 110 may provide user-accessible photos, 8-1-1 ticket data, location history and damage data when recorded.

For excavation engineering and records management, such as project managers, in one case, users may face the challenge associated with a delay in acquiring as-builts from utility companies that are used to create overall plans and budget. Delay is inceptive to the miss-use of 8-1-1 dig alert system. The computing server 110 may provide as-builts data in a geotagged map. On demand function prevents the misuse of 8-1-1 system to obtain as-built information. In one case, users may face the challenge associated with delays caused by locator performance being inaccurate or late. The computing server 110 may provide locators with an application 122 to respond more accurately and if the locator was delayed, data was available to help mitigate work delays.

For engineers related to excavation engineering and records management, in one case, users may face the challenge associated with design delays from misinformation or lack of information on geo-positioning of utility facilities. The computing server 110 may provide application 122 to give a live record of geo-positioning of existing facilities to remove delays. In one case, users may face the challenge associated with delays in corresponding with utility companies for civil engineering design coordination requirements. The computing server 110 may provide live data that reconciles misinformation to reduce additional meetings. Chat function offers communication solutions when users link together, either in a project chat group or single person-to-person link.

For records management, in one case, users may face the challenge associated with maintaining records of utility location at the worksite adds cost and there is a risk of inaccuracies and omissions. The computing server 110 may provide application 122 to hold known utility information, including information uploaded by users.

For risk management and investigator users, in one case, users may face the challenge associated with not being able to access plant records at the time of damage, no timestamp on inhouse facilities records, and no geotagging. The computing server 110 may provide data includes known plant installation date, date of geotagging data recorded and displayed (last located/potholed date and time). In one case, users may face the challenge associated with no definitive means to verify if records given to locators. The computing server 110 may provide the application 122, which can be a uniformed mapping platform that displays the same data to risk management and locators across organizations. In one case, users may face the challenge associated with no definitive means to verify if facilities are marked on time and accurate. The computing server 110 may provide, rather than the word of mouth or 8-1-1 ticket dispatch data, records from application 122 and update uploads. In one case, users may face the challenge associated with delay and uncertainty in verifying 8-1-1 tickets associated with damage. The computing server 110 may provide investigators with application 122 to geographically indicate an area of damage and download known 8-1-1 tickets provided by locators and known excavator users.

In one case, users may face the challenge associated with verifying and maintaining geolocation of prior damages adds expense and geotagging accuracy not reliable. The computing server 110 may provide records from application 122 damage date including 8-1-1 information and geotagged assets involved in a given damage incident.

In one case, users may face the challenge associated with Field inspection of old damage where marks and damage are covered up or removed creates long delays and follow-up meetings and inspections. The computing server 110 may stores user-accessible photos, 8-1-1 ticket data, locate history, and damage data when recorded.

For excavators and project owners/managers, in one case, users may face the challenge associated with not being able to access 8-1-1 ticket data not originating internally. The computing server 110 may provide 8-1-1 ticket data stored, whether the tickets are uploaded by other users or provided by a third-party data source. In one case, users may face the challenge associated with not being able to access plant records at the time of damage, no time stamp on inhouse facilities records geotagging. The computing server 110 may provide data that includes known plant installation date, date of geotagging data recorded, and displayed (last located/potholed date and time). In one case, users may face the challenge associated with no definitive means to verify if records are given to locators. The computing server 110 may provide application 122 as a uniformed mapping platform that displays the same data to risk management and locators across organizations. In one case, users may face the challenge associated with no definitive means to verify if facilities marked on time and accurate. The computing server 110 may provide, rather than the word of mouth or 8-1-1 ticket dispatch data, records from application 122, record access, and update uploads. In one case, users may face the challenge associated with delay and uncertainty in verifying 8-1-1 tickets associated with damage. The computing server 110 may provide investigator can use application 122 to geographically indicate the area of damage and download known 8-1-1 tickets by locators and known excavator users.

In one case, users may face the challenge associated with verifying and maintaining geolocation of prior damages adds expense and geotagging accuracy not reliable. The computing server 110 may provide records from application 122, including damage date, 8-1-1 information, and geotagged assets involved in a given damage incident. In one case, users may face the challenge associated with not being able to definitively prove when excavation and mark inspections occurred before damage. The computing server 110 may provide users with record verification of marks, pothole finding and the application 122 can record the exact time of excavation/damage.

Example Machine Learning Model

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, the process of benchmark recognition and ground mark recognition discussed in FIG. 4, various object recognition and other processes may apply one or more machine learning and deep learning techniques. In one embodiment, object recognition is performed using a CNN, whose example structure is shown in FIG. 7.

In various embodiments, the training techniques for a machine learning model may be supervised, semi-supervised, or unsupervised. In supervised learning, the machine learning models may be trained with a set of training samples that are labeled. For example, for a machine learning model trained to classify objects, the training samples may be different images of objects labeled with the type of objects. The labels for each training sample may be binary or multi-class. In some cases, an unsupervised learning technique may be used. The samples used in training are not labeled. Various unsupervised learning technique such as clustering may be used. In some cases, the training may be semi-supervised with training set having a mix of labeled samples and unlabeled samples.

A machine learning model may be associated with an objective function, which generates a metric value that describes the objective goal of the training process. For example, the training may intend to reduce the error rate of the model in generating predictions. In such a case, the objective function may monitor the error rate of the machine learning model. In object recognition (e.g., object detection and classification), the objective function of the machine learning algorithm may be the training error rate in classifying objects in a training set. Such an objective function may be called a loss function. Other forms of objective functions may also be used, particularly for unsupervised learning models whose error rates are not easily determined due to the lack of labels. In image segmentation, the objective function may correspond to the difference between the model's predicted segments and the manually identified segments in the training sets. In various embodiments, the error rate may be measured as cross-entropy loss, L1 loss (e.g., the sum of absolute differences between the predicted values and the actual value), L2 loss (e.g., the sum of squared distances).

Figure 7:
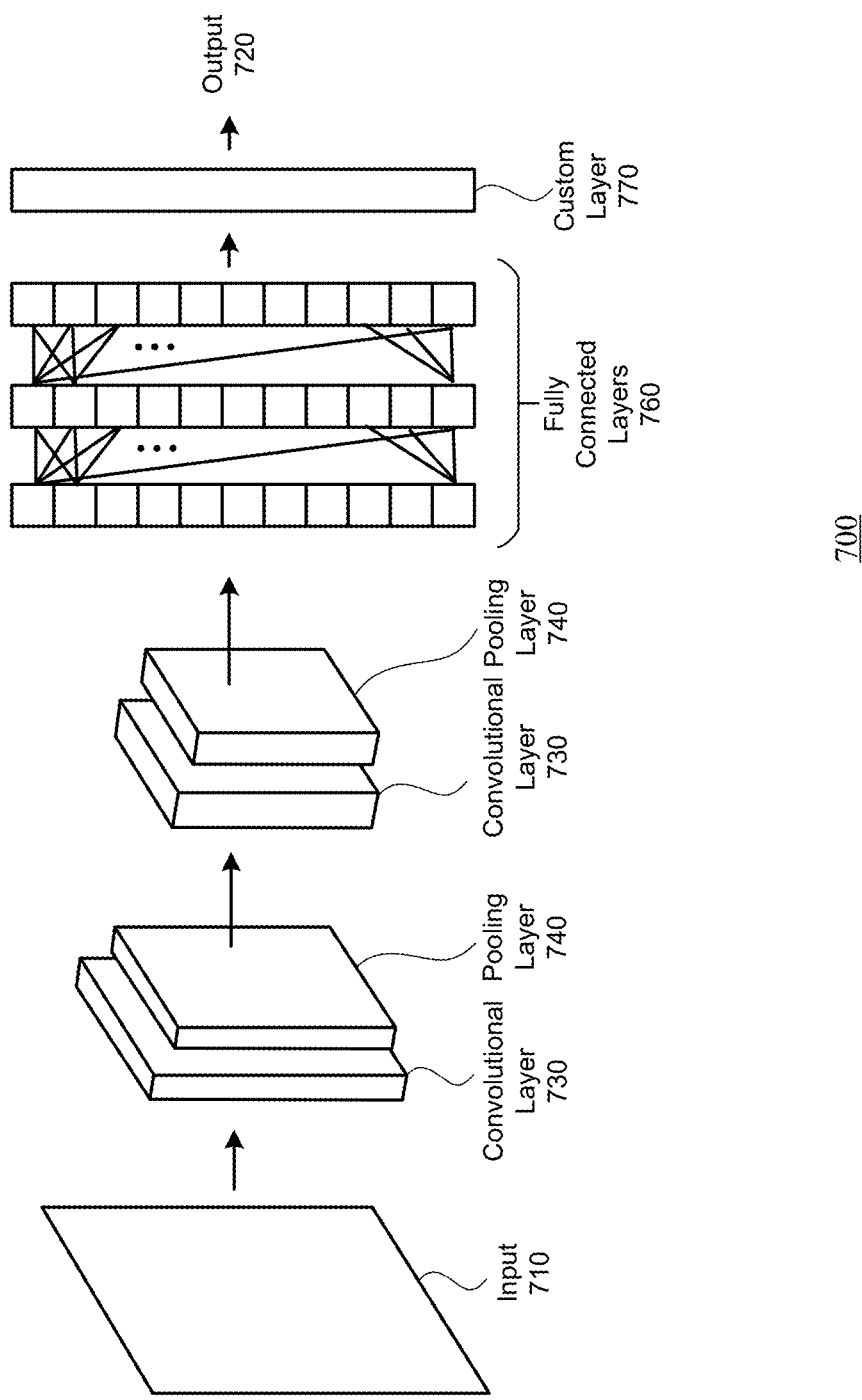
FIG. 7 is a block diagram illustrating the structure of an example machine learning model, in accordance with some embodiments.

Referring to FIG. 7, a structure of an example CNN is illustrated, according to an embodiment. The CNN 700 may receive an input 710 and generate an output 720. The CNN 700 may include different kinds of layers, such as convolutional layers 730, pooling layers 740, full connected layers 760, and custom layers 770. A convolutional layer 730 convolves the input of the layer (e.g., an image) with one or more kernels to generate different types of images that are filtered by the kernels to generate feature maps. Each convolution result may be associated with an activation function. A convolutional layer 730 may be followed by a pooling layer 740 that selects the maximum value (max pooling) or average value (average pooling) from the portion of the input covered by the kernel size. The pooling layer 740 reduces the spatial size of the extracted features. The layers 730 and 740 may be followed in multiple fully connected layers 760 that have nodes (represented by squares in FIG. 7) connected to each other. The fully connected layers 760 may be used for classification and object detection. In one embodiment, one or more custom layers 770 may also be presented for the generation of a specific format of output 720. For example, a custom layer may be used for image segmentation for labeling pixels of an image input with different segment labels.

The order of layers and the number of layers of the CNN 700 in FIG. 7 is for example only. In various embodiments, a CNN 700 includes one or more convolutional layer 730 but may or may not include any pooling layer 740 or recurrent layer 750. If a pooling layer 740 is present, not all convolutional layers 730 are always followed by a pooling layer 740. A CNN may also include a recurrent layer, which is not shown in FIG. 7. For each convolutional layer 730, the sizes of kernels (e.g., 3×3, 5×5, 7×7, etc.) and the numbers of kernels allowed to be learned may be different from other convolutional layers 730.

A machine learning model may include certain layers, nodes, kernels and/or coefficients. Training of a neural network, such as the CNN 700, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g. weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing prediction, object detection, image segmentation, or another suitable task for which the model is trained.

Computing Machine Architecture

FIG. 8 is a block diagram illustrating components of an example computing machine that is capable of reading instructions from a computer-readable medium and execute them in a processor (or controller). A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIGS. 1 and 2, including but not limited to the computing server 110, the user device 120 and various engines, interfaces, terminals, and machines shown in FIG. 2. While FIG. 8 shows various hardware and software elements, each of the components described in FIG. 1 or FIG. 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" and "computer" may also be taken to include any collection of machines that individually or jointly execute instructions 824 to perform any one or more of the methodologies discussed herein.

The example computer system 800 includes one or more processors 802 such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the computing system 800 may also include a memory 804 that store computer code including instructions 824 that may cause the processors 802 to perform certain actions when the instructions are executed, directly or indirectly by the processors 802. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 802 and reduces the space required for the memory 804. For example, the machine learning methods described herein reduces the complexity of the computation of the processors 802 by applying one or more novel techniques that simplify the steps in training, reaching convergence, and generating results of the processors 802. The algorithms described herein also reduces the size of the models and datasets to reduce the storage space requirement for memory 804.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 800 may include a main memory 804, and a static memory 806, which are configured to communicate with each other via a bus 808. The computer system 800 may further include a graphics display unit 810 (e.g., a plasma display panel (PDP), a liquid crystal display (LCD), a projector, or a cathode ray tube (CRT)). The graphics display unit 810, controlled by the processors 802, displays a graphical user interface (GUI) to display one or more results and data generated by the processes described herein. The computer system 800 may also include an alphanumeric input device 812 (e.g., a keyboard), a cursor control device 814 (e.g., a mouse, a trackball, a joystick, a motion sensor, or another pointing instrument), a storage unit 816 (a hard drive, a solid state drive, a hybrid drive, a memory disk, etc.), a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the processors (e.g., processors 802) and that causes the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for providing digital excavation information, the computer-implemented method comprising:

receiving, from a digital map provider, an image of a street view of a physical site;

identifying one or more ground marks from the image, the ground marks related to utility line marks or excavation marks that are physically painted on the ground;

identifying a first set of pixels in the image that correspond to the one or more ground marks identified in the image;

receiving geographic information system (GIS) data of the physical site, the GIS data comprising survey-accurate location data of a plurality of benchmarks at the physical site, the benchmarks being physical benchmarks;

identifying, using an object recognition algorithm, a second set of pixels in the image of the street view, the second set of pixels corresponding to one or more benchmarks recorded in the GIS data;

determining physical locations of the one or more benchmarks using the survey-accurate location data;

determining relative distances between the first set of pixels that correspond to the one or more ground marks and the second set of pixels that correspond to the one or more benchmarks;

determining, from the survey-accurate location data of the one or more benchmarks and based on the relative distances between the first set of pixels and the second set of pixels, location data of the one or more ground marks; and transmitting the location data for display in a digital map that includes one or more digital marks corresponding to the one or more ground marks.

2. The computer-implemented method of claim 1, further comprising:

receiving data related to a construction permit from a data source;

identifying, based on the construction permit, an address of a construction site;

activating a street-view mode of a second digital map at the address; and capture a screenshot of the street-view mode at the address, the screenshot being the image of the street view of the physical site.

3. The computer-implemented method of claim 1, wherein the image of a street view is a screenshot of a street-view mode of a digital map or a photo taken by a user at the physical site.

4. The computer-implemented method of claim 1, further comprising:

providing the location data of one of the ground marks to a user;

transmitting a communication to the user, at the physical site, to invite the user to stand nearby the ground mark and capture a global position system (GPS) location of the ground mark using a GPS enabled mobile device;

receiving the GPS location of the ground mark; and refining the location data of the one of the ground marks using the GPS location of the ground mark.

5. The computer-implemented method of claim 1, further comprising:

storing depth information of a utility line corresponding to the one or more ground marks in a data store; and transmitting the depth information for display.

6. The computer-implemented method of claim 1, further comprising:

receiving, from a utility company, information regarding a utility line corresponding to the one or more ground marks;

augmenting the information regarding the utility line with the determined location data of the one or more ground marks; and providing the augmented information to the utility company.

7. The computer-implemented method of claim 1, further comprising:

receiving one or more text responses from a user at the physical site, one of the text responses concerning a condition of a utility line corresponding to the one or more ground marks; and augmenting the location data of the one or more ground marks with information from the one or more text responses.

8. The computer-implemented method of claim 1, further comprising:

providing a probability that the location data of the one or more ground marks is accurate, wherein the probability is determined based on whether the determined location data is supported by a photo taken at the physical site and a number of data sources that are in agreement of the location data.

9. The computer-implemented method of claim 1, wherein the GIS data is a GIS map, and determining the location data of the one or more ground marks comprises overlaying the GIS map with the image of the street view based on one or more benchmarks appearing in both the GIS map and the image of the street view.

10. The computer-implemented method of claim 1, further comprising:

transmitting information of past excavation project tickets for display at a graphical user interface that includes the digital map.

11. The computer-implemented method of claim 1, wherein the plurality of benchmarks comprises one or more of the following: a property line, a streetlight, a street sign, a street intersection, a gutter, a railroad track, a storm drain, and/or a tree.

12. The computer-implemented method of claim 1, wherein the surveyed location information of the plurality of benchmarks include global position system (GPS) data of the plurality of benchmarks.

13. A non-transitory computer readable medium for storing computing code comprising instructions, the instructions, when executed by one or more processors, cause the one or more processors to perform steps comprising:

receiving, from a digital map provider, an image of a street view of a physical site;

identifying one or more ground marks from the image, the ground marks related to utility line marks or excavation marks that are physically painted on the ground;

identifying a first set of pixels in the image that correspond to the one or more ground marks identified in the image;

receiving geographic information system (GIS) data of the physical site, the GIS data comprising survey-accurate location data of a plurality of benchmarks at the physical site, the benchmarks being physical benchmarks;

identifying, using an object recognition algorithm, a second set of pixels in the image of the street view, the second set of pixels corresponding to one or more benchmarks recorded in the GIS data;

determining physical locations of the one or more benchmarks using the survey-accurate location data;

determining relative distances between the first set of pixels that correspond to the one or more ground marks and the second set of pixels that correspond to the one or more benchmarks;

determining, from the survey-accurate location data of the one or more benchmarks and based on the relative distances between the first set of pixels and the second set of pixels, location data of the one or more ground marks; and transmitting the location data for display in a digital map that includes one or more digital marks corresponding to the one or more ground marks.

14. The non-transitory computer readable medium of claim 13, wherein the steps further comprise:

providing the location data of one of the ground marks to a user;

transmitting a communication to the user, at the physical site, to invite the user to stand nearby the ground mark and capture a global position system (GPS) location of the ground mark using a GPS enabled mobile device;

receiving the GPS location of the ground mark; and refining the location data of the one of the ground marks using the GPS location of the ground mark.

15. The non-transitory computer readable medium of claim 13, wherein the steps further comprise:
receiving, from a utility company, information regarding a utility line corresponding to the one or more ground marks;
augmenting the information regarding the utility line with the determined location data of the one or more ground marks; and
providing the augmented information to the utility company.

16. The non-transitory computer readable medium of claim 13, wherein the steps further comprise:
providing a probability that the location data of the one or more ground marks is accurate, wherein the probability is determined based on whether the determined location data is supported by a photo taken at the physical site and a number of data sources that are in agreement of the location data.

17. A system comprising:
one or more processors; and
memory for storing computing code comprising instructions, the instructions, when executed by the one or more processors, cause the one or more processors to perform steps comprising:
receiving, from a digital map provider, an image of a street view of a physical site;
identifying one or more ground marks from the image, the ground marks related to utility line marks or excavation marks that are physically painted on the ground;
identifying a first set of pixels in the image that correspond to the one or more ground marks identified in the image;
receiving geographic information system (GIS) data of the physical site, the GIS data comprising survey-accurate location data of a plurality of benchmarks at the physical site, the benchmarks being physical benchmarks;
identifying, using an object recognition algorithm, a second set of pixels in the image of the street view, the second set of pixels corresponding to one or more benchmarks recorded in the GIS data;
determining physical locations of the one or more benchmarks using the survey-accurate location data;
determining relative distances between the first set of pixels that correspond to the one or more ground marks and the second set of pixels that correspond to the one or more benchmarks;
determining, from the survey-accurate location data of the one or more benchmarks and based on the relative distances between the first set of pixels and the second set of pixels, location data of the one or more ground marks; and
transmitting the location data for display in a digital map that includes one or more digital marks corresponding to the one or more ground marks.

18. The system of claim 17, wherein the steps further comprise:
providing the location data of one of the ground marks to a user;
transmitting a communication to the user, at the physical site, to invite the user to stand nearby the ground mark and capture a global position system (GPS) location of the ground mark using a GPS enabled mobile device;
receiving the GPS location of the ground mark; and
refining the location data of the one of the ground marks using the GPS location of the ground mark.

19. The system of claim 17, wherein the steps further comprise:
receiving, from a utility company, information regarding a utility line corresponding to the one or more ground marks;
augmenting the information regarding the utility line with the determined location data of the one or more ground marks; and
providing the augmented information to the utility company.

20. The system of claim 17, wherein the steps further comprise:
providing a probability that the location data of the one or more ground marks is accurate, wherein the probability is determined based on whether the determined location data is supported by an image taken at the physical site and a number of data sources that are in agreement of the location data.

* * * * *